(12) United States Patent
Shimada et al.

(10) Patent No.: US 12,088,933 B2
(45) Date of Patent: Sep. 10, 2024

(54) PHOTOELECTRIC CONVERSION APPARATUS WITH MULTIPLE SELECTION CIRCUITS

(71) Applicant: CANON KABUSHIKI KAISHA, Tokyo (JP)

(72) Inventors: Atsushi Shimada, Kanagawa (JP); Noriyuki Shikina, Tokyo (JP); Yoshiko Shigiya, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/067,929

(22) Filed: Dec. 19, 2022

(65) Prior Publication Data

US 2023/0209217 A1 Jun. 29, 2023

(30) Foreign Application Priority Data

Dec. 24, 2021 (JP) ................................. 2021-211290

(51) Int. Cl.
*H04N 25/42* (2023.01)
*B60Q 9/00* (2006.01)
(Continued)

(52) U.S. Cl.
CPC ............. *H04N 25/42* (2023.01); *H04N 25/77* (2023.01); *H04N 25/79* (2023.01); *B60Q 9/008* (2013.01)

(58) Field of Classification Search
CPC ........ H04N 25/42; H04N 25/77; H04N 25/79; H04N 25/40; H04N 25/78; H04N 23/667; H04N 23/745; H04N 25/00; H04N 25/44; H04N 25/441; H04N 25/445; H04N 25/46; H04N 25/70; H04N 25/74; H04N 25/76; H04N 25/766; H04N 25/779; B60Q 9/008

See application file for complete search history.

(56) References Cited

U.S. PATENT DOCUMENTS 10,389,964 B2    8/2019   Taniguchi et al.
10,567,747 B2 *   2/2020   Hayashi ............... H04N 25/745
(Continued)

FOREIGN PATENT DOCUMENTS

JP    2007-150643 A    6/2007
JP    2015-012489 A    1/2015
(Continued)

*Primary Examiner* — Albert H Cutler
(74) *Attorney, Agent, or Firm* — Venable LLP

(57) ABSTRACT

A photoelectric conversion apparatus comprising: pixels; L (L≥3) vertical signal lines disposed on each pixel column; M (M≥2) selection circuits disposed in each pixel, each of the selection circuits respectively connecting one of the pixels to a different vertical signal line; a vertical scanning circuit configured to scan the selection circuits; and a control unit. The control unit sets first operation mode in which the vertical scanning circuit performs a single read scanning operation at a time, and a second operation mode in which the vertical scanning circuit performs multiple read scanning operations at a time. In the first operation mode, the control unit uses first selection circuit out of the M selection circuits for scanning operation. In the second operation mode, the control unit uses a second selection circuit, which is different from the first selection circuit, out of the M selection circuits for scanning operation.

16 Claims, 20 Drawing Sheets

(51) Int. Cl.
　　　*H04N 25/77*　　　(2023.01)
　　　*H04N 25/79*　　　(2023.01)

(56) References Cited

U.S. PATENT DOCUMENTS

| | | | |
|---|---|---|---|
| 10,645,316 | B2 | 5/2020 | Shigiya et al. |
| 10,659,713 | B2 | 5/2020 | Shikina |
| 11,202,023 | B2 | 12/2021 | Shigiya et al. |
| 11,303,829 | B2 | 4/2022 | Shigiya et al. |
| 11,425,325 | B2 | 8/2022 | Kasugai et al. |
| 11,490,041 | B2 | 11/2022 | Shigiya et al. |
| 2007/0126909 | A1 | 6/2007 | Kuruma |
| 2016/0156869 | A1 | 6/2016 | Ise |
| 2016/0295140 | A1 | 10/2016 | Moriyama et al. |
| 2017/0064226 | A1* | 3/2017 | Ishii .................. G02B 7/346 |
| 2017/0195603 | A1 | 7/2017 | Kawazu et al. |
| 2019/0371836 | A1* | 12/2019 | Ogino ................ H01L 27/1462 |
| 2020/0128200 | A1* | 4/2020 | Sambonsugi .......... H04N 25/74 |
| 2020/0154031 | A1* | 5/2020 | Haraguchi ............ H04N 23/73 |
| 2020/0154067 | A1 | 5/2020 | Garashi et al. |
| 2020/0322560 | A1* | 10/2020 | Haraguchi ............ H04N 25/50 |
| 2021/0044766 | A1 | 2/2021 | Shikina et al. |
| 2021/0176421 | A1 | 6/2021 | Shikina et al. |
| 2022/0094875 | A1 | 3/2022 | Shikina et al. |
| 2023/0300488 | A1* | 9/2023 | Suzuki .............. H01L 27/14634 |
| | | | 348/294 |

FOREIGN PATENT DOCUMENTS

| | | |
|---|---|---|
| JP | 2016-189581 A | 11/2016 |
| JP | 2020-141405 A | 9/2020 |
| WO | 2015/133323 A1 | 9/2015 |

\* cited by examiner

| ROW | SEL1 (M4) | SEL2 (M5) |
|---|---|---|
| 1 | VL1 | VL1 |
| 2 | VL2 | VL5 |
| 3 | VL3 | (ANY) |
| 4 | VL4 | VL2 |
| 5 | VL5 | VL6 |
| 6 | VL6 | (ANY) |
| 7 | VL1 | VL3 |
| 8 | VL2 | VL5 |
| 9 | VL3 | (ANY) |
| 10 | VL4 | VL4 |
| 11 | VL5 | VL6 |
| 12 | VL6 | (ANY) |

FIG. 4B

| ROW | SEL1 (M15) | SEL2 (M16) | SEL3 (M17) |
|---|---|---|---|
| 1 | VL1 | VL9 | VL1 |
| 2 | VL2 | VL10 | VL9 |
| 3 | VL3 | VL1 | (ANY) |
| 4 | VL4 | VL2 | VL2 |
| 5 | VL5 | VL3 | VL10 |
| 6 | VL6 | VL4 | (ANY) |
| 7 | VL7 | VL5 | VL3 |
| 8 | VL8 | VL6 | VL9 |
| 9 | VL9 | VL7 | (ANY) |
| 10 | VL10 | VL8 | VL4 |
| 11 | VL1 | VL9 | VL10 |
| 12 | VL2 | VL10 | (ANY) |
| 13 | VL3 | VL1 | VL5 |
| 14 | VL4 | VL2 | VL9 |
| 15 | VL5 | VL3 | (ANY) |
| 16 | VL6 | VL4 | VL6 |
| 17 | VL7 | VL5 | VL10 |
| 18 | VL8 | VL6 | (ANY) |
| 19 | VL9 | VL7 | VL7 |
| 20 | VL10 | VL8 | VL9 |
| 21 | VL1 | VL9 | (ANY) |
| 22 | VL2 | VL10 | VL8 |
| 23 | VL3 | VL1 | VL10 |
| 24 | VL4 | VL2 | (ANY) |

FIG. 13B

| PIXEL ROW | SELECTION TRANSISTOR | VERTICAL LINE |
|---|---|---|
| 1 | M15 | ck_vl1 |
| 2 | M15 | ck_vl2 |
| 3 | M15 | ck_vl3 |
| 4 | M15 | ck_vl4 |
| 5 | M15 | ck_vl5 |
| 6 | M15 | ck_vl6 |
| 7 | M15 | ck_vl7 |
| 8 | M15 | ck_vl8 |
| 9 | M15 | ck_vl9 |
| 10 | M15 | ck_vl10 |
| 11 | M15 | ck_vl1 |
| 12 | M15 | ck_vl2 |
| 13 | M15 | ck_vl3 |
| 14 | M15 | ck_vl4 |
| 15 | M15 | ck_vl5 |
| 16 | M15 | ck_vl6 |
| 17 | M15 | ck_vl7 |
| 18 | M15 | ck_vl8 |
| 19 | M15 | ck_vl9 |
| 20 | M15 | ck_vl10 |
| 21 | M15 | ck_vl1 |
| 22 | M15 | ck_vl2 |
| 23 | M15 | ck_vl3 |
| 24 | M15 | ck_vl4 |
| 25 | M15 | ck_vl5 |
| 26 | M15 | ck_vl6 |
| 27 | M15 | ck_vl7 |
| 28 | M15 | ck_vl8 |
| 29 | M15 | ck_vl9 |
| 30 | M15 | ck_vl10 |

SELECTION TRANSISTOR WHICH EACH ROW USES AND VERTICAL LINE TO BE CONNECTED DURING READ OPERATION

FIG. 14

| PIXEL ROW | SELECTION TRANSISTOR | VERTICAL LINE |
|---|---|---|
| 1 | M15 | ck_vl1 |
| 2 | – | – |
| 3 | M16 | ck_vl1 |
| 4 | M15 | ck_vl4 |
| 5 | – | – |
| 6 | M16 | ck_vl4 |
| 7 | M15 | ck_vl7 |
| 8 | – | – |
| 9 | M16 | ck_vl7 |
| 10 | M15 | ck_vl10 |
| 11 | – | – |
| 12 | M16 | ck_vl10 |
| 13 | M15 | ck_vl3 |
| 14 | – | – |
| 15 | M16 | ck_vl3 |
| 16 | M15 | ck_vl6 |
| 17 | – | – |
| 18 | M16 | ck_vl6 |
| 19 | M15 | ck_vl9 |
| 20 | – | – |
| 21 | M16 | ck_vl9 |
| 22 | M15 | ck_vl2 |
| 23 | – | – |
| 24 | M16 | ck_vl2 |
| 25 | M15 | ck_vl5 |
| 26 | – | – |
| 27 | M16 | ck_vl5 |
| 28 | M15 | ck_vl8 |
| 29 | – | – |
| 30 | M16 | ck_vl8 |

SELECTION TRANSISTOR WHICH EACH ROW USES AND VERTICAL LINE TO BE CONNECTED DURING READ OPERATION

FIG. 15

| PIXEL ROW | SELECTION TRANSISTOR | VERTICAL LINE |
|---|---|---|
| 1 | M17 | ck_vl1 |
| 2 | M17 | ck_vl9 |
| 3 | - | - |
| 4 | M17 | ck_vl2 |
| 5 | M17 | ck_vl10 |
| 6 | - | - |
| 7 | M17 | ck_vl3 |
| 8 | M17 | ck_vl9 |
| 9 | - | - |
| 10 | M17 | ck_vl4 |
| 11 | M17 | ck_vl10 |
| 12 | - | - |
| 13 | M17 | ck_vl5 |
| 14 | M17 | ck_vl9 |
| 15 | - | - |
| 16 | M17 | ck_vl6 |
| 17 | M17 | ck_vl10 |
| 18 | - | - |
| 19 | M17 | ck_vl7 |
| 20 | M17 | ck_vl9 |
| 21 | - | - |
| 22 | M17 | ck_vl8 |
| 23 | M17 | ck_vl10 |
| 24 | - | - |
| 25 | M17 | ck_vl1 |
| 26 | M17 | ck_vl9 |
| 27 | - | - |
| 28 | M17 | ck_vl2 |
| 29 | M17 | ck_vl10 |
| 30 | - | - |

SELECTION TRANSISTOR WHICH EACH ROW USES AND VERTICAL LINE TO BE CONNECTED DURING READ OPERATION

FIG. 16

PHOTOELECTRIC CONVERSION APPARATUS WITH MULTIPLE SELECTION CIRCUITS

BACKGROUND OF THE INVENTION

Field of the Invention

The present disclosure relates to a photoelectric conversion apparatus.

Description of the Related Art

In such an imaging apparatus as a digital camera, which includes a CMOS image sensor used as an XY address type image pickup element, images having different purposes can be captured concurrently by performing a plurality of vertical read scanning operations concurrently. For example, flicker detection can be performed while displaying a live view image.

WO2015/133323 discloses a solid-state imaging apparatus (photoelectric conversion apparatus) which includes only one selection transistor in each pixel, in order to be connected to a vertical signal line and to read signal information of the pixel, and perform a plurality of vertical read scanning concurrently.

In the case of the photoelectric conversion apparatus disclosed in WO2015/133323, however, only one selection transistor is disposed in each pixel, hence only one pattern of connection is possible between a vertical signal line and a pixel row. This means that in a case where two different vertical read scanning operations are performed concurrently, the setting of each vertical scanning operation has restrictions. Furthermore, when a desired vertical read scanning operation is attempted, some vertical signal lines may be unusable. A number of unusable vertical signal lines increases as a number of vertical signal lines on each column increases.

SUMMARY OF THE INVENTION

It is an object of the present disclosure to provide a photoelectric conversion apparatus that has less restrictions in setting of vertical scanning operation, even in a mode of performing a plurality of different vertical scanning operations concurrently, and can reduce unusable vertical signal lines even if a number of vertical signal lines increases.

The first aspect of the disclosure is a photoelectric conversion apparatus comprising: pixels disposed two-dimensionally in a row direction and a column direction; an L number of (L is 3 or greater integer) vertical signal lines disposed on each pixel column; an M number of (M is 2 or greater integer) selection circuits disposed in each pixel, each of the selection circuits respectively connecting one of the pixels to a different vertical signal line; a vertical scanning circuit configured to scan the selection circuits; and a control unit, wherein the control unit is configured to set first operation mode in which the vertical scanning circuit performs a single read scanning operation at a time, and a second operation mode in which the vertical scanning circuit performs a plurality of read scanning operations at a time, wherein, in the first operation mode, the control unit is configured to perform the read scanning operation using a first selection circuit out of the M number of selection circuits, and wherein, in the second operation mode, the control unit is configured to perform the read scanning operation using a second selection circuit, which is different from the first selection circuit, out of the M number of selection circuits.

The second aspect of the disclosure is a photoelectric conversion apparatus comprising: pixels disposed two-dimensionally in a row direction and a column direction; an L number of (L is 3 or greater integer) vertical signal lines disposed on each pixel column; an M number of (M is 2 or greater integer) selection circuits disposed in each pixel; and a vertical scanning circuit configured to scan the selection circuits, wherein each of the vertical signal lines is connected to at least one selection circuit in every L rows, wherein P number of (P is an integer that is at least 1 and less than L) vertical signal lines out of the L number of vertical signal lines are connected to at least one selection circuit in every S×P (S is 2 or greater integer) rows, and wherein L−P number of vertical signal lines, other than the P number of vertical signal lines out of the L number of vertical signal lines, are connected to at least one selection circuit in every S×(L−P) rows.

According to the disclosure, provided is a photoelectric conversion apparatus that has less restrictions in setting of vertical scanning operation, even in a mode of performing a plurality of different vertical scanning operations concurrently, and can reduce unusable vertical signal lines even if a number of vertical signal lines increases.

Further features of the present invention will become apparent from the following description of exemplary embodiments with reference to the attached drawings.

BRIEF DESCRIPTION OF THE DRAWINGS

FIG. 4B is a table indicating a connection relationship between selection transistors and vertical signal lines according to Example 1;

FIG. 13B is a table indicating a connection relationship between selection transistors and vertical signal lines according to Example 3;

FIG. 14 is a table indicating a connection relationship 1 between a pixel and a vertical signal line during the read scanning operation according to Example 3;

FIG. 15 is a table indicating a connection relationship 2 between a pixel and a vertical signal line during the read scanning operation according to Example 3;

FIG. 16 is a table indicating a connection relationship 3 between a pixel and a vertical signal line during read scanning according to Example 3;

DESCRIPTION OF THE EMBODIMENTS

Example 1

An embodiment of the solid-state imaging apparatus (photoelectric conversion apparatus) according to the present disclosure will be described with reference to the drawings. The following description is merely an example to explain the present disclosure and is not intended to limit the present disclosure to the following embodiments. The present disclosure can be modified in various ways within the technical spirit thereof.

Overall Block Diagram

Figure 1:
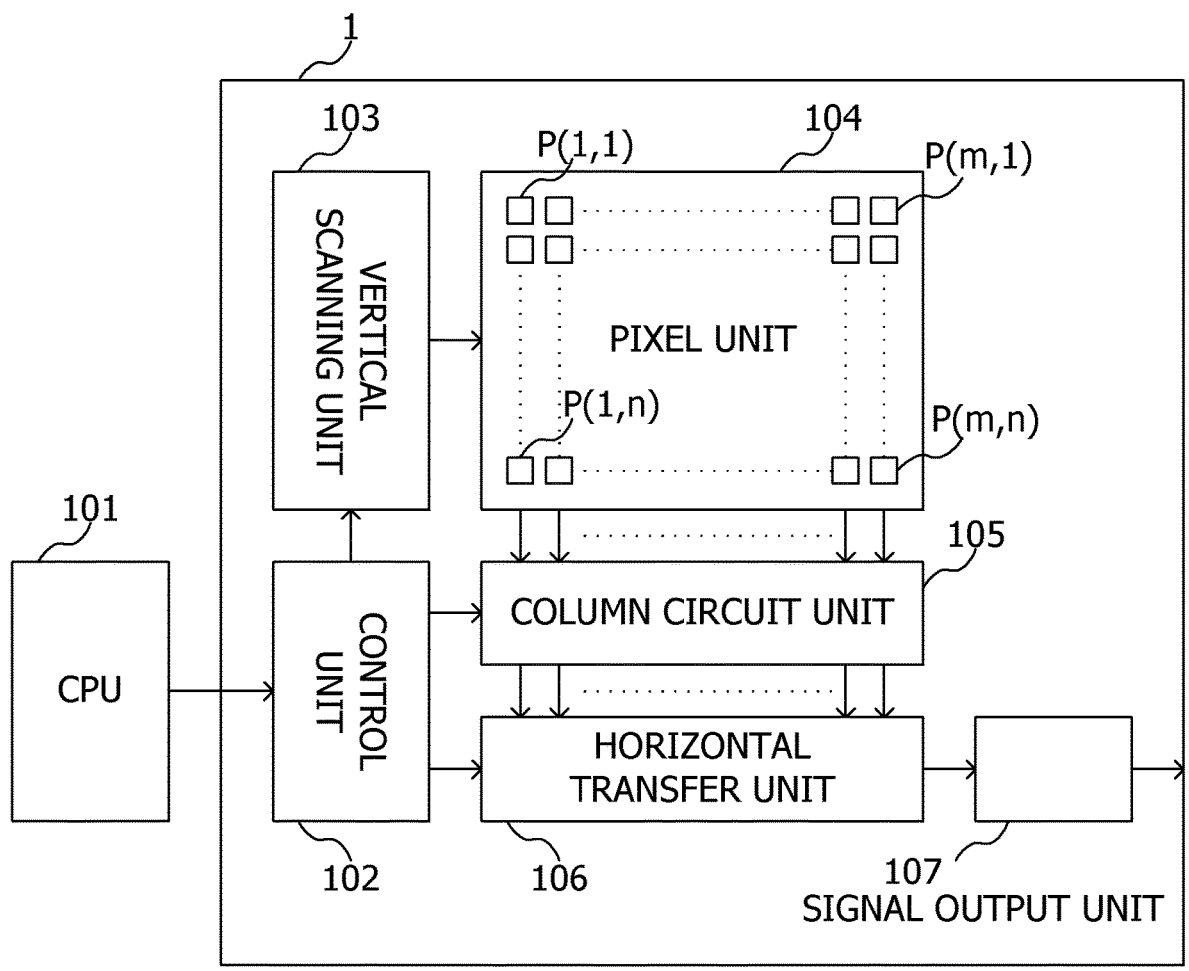
FIG. 1 is a block diagram depicting a configuration example of a solid-state imaging apparatus according to Example 1.

FIG. 1 is a block diagram depicting a configuration example of a solid-state imaging apparatus according to Example 1. The solid-state imaging apparatus 1 includes a control unit 102, a vertical scanning unit 103, a pixel unit 104, a column circuit unit 105, a horizontal transfer unit 106 and a signal output unit 107. The solid-state imaging apparatus 1 is controlled by a CPU 101. The CPU 101 may be disposed inside an imaging system in which the imaging apparatus is installed, that is, the CPU 101 may be disposed outside the imaging apparatus.

The control unit 102 operates by receiving control signals, such as synchronizing signals from the CPU 101 and setting signals for an operation mode and the like.

The vertical scanning unit 103 receives control signals from the control unit 102, and performs an electronic shutter scanning operation and a read scanning operation in the pixel unit 104. "Electronic shutter scanning operation" refers to an operation to sequentially clear the reset state of each photoelectric conversion element, and set each photoelectric conversion element to charge storing state, so as to start exposure, to pixels on a part or all of the rows of the pixel unit 104. "Read scanning operation" refers to an operation to sequentially output a signal, based on charges stored in each photoelectric conversion element, to the pixels on a part or all of the rows of the pixel unit 104.

The pixel unit 104 includes a plurality of pixels that are disposed two-dimensionally in the row direction and the column direction. A pixel is at an n-th row and an m-th column, and is referred to as pixel P (1, 1) to P (m, n) respectively. The row direction indicates the horizontal direction in the drawings, and the column direction indicates the vertical direction in the drawings. Suffixes in parentheses of the pixel P (m, n) indicate the column number and the row number, respectively. The row number of the first row is row 1, and the column number of the first column is column 1.

The column circuit unit 105 includes an amplification circuit, an analog-digital conversion (hereafter "AD conversion") circuit, and a memory. The column circuit unit 105 amplifies a signal read from the pixel unit 104, performs AD conversion thereon, and holds the converted digital signal in the memory.

The horizontal transfer unit 106 receives a control signal from the control unit 102, and sequentially scans and outputs the signals held in the memory of the column circuit unit 105.

The signal output unit 107 includes a digital processing unit, a parallel-serial conversion circuit, and such an output circuit as a low voltage differential signaling (LVDS) circuit. The signal output unit 107 performs digital processing on a signal outputted from the horizontal transfer unit 106, and outputs the processed signal to outside the imaging apparatus as serial data.

It is not essential that the column circuit unit 105 has the AD conversion function, and this configuration may be modified such that the AD conversion is performed outside the imaging apparatus, for example. In this case, the configuration of the horizontal transfer unit 106 and the signal output unit 107 is also appropriately modified so as to match with the processing of analog signals.

Pixel P

Figure 2:
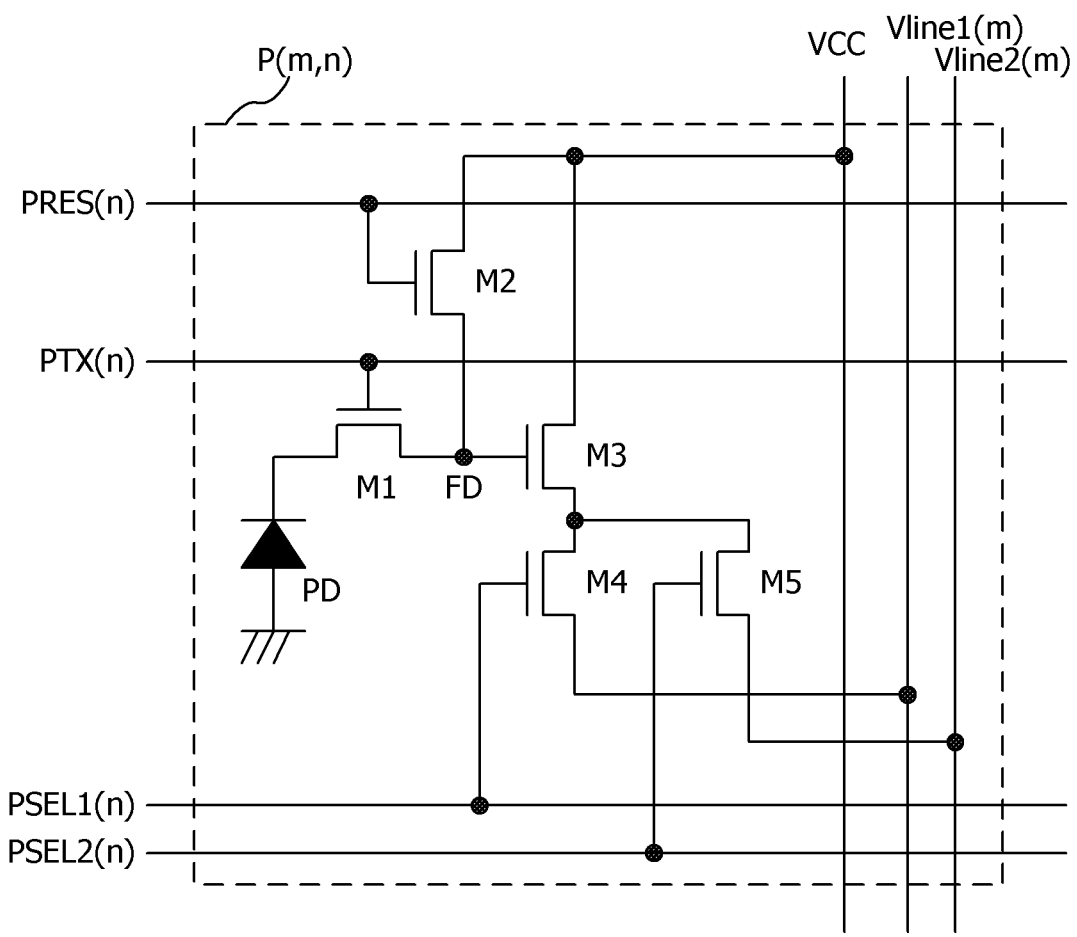
FIG. 2 is an equivalent circuit diagram of a pixel according to Example 1.

FIG. 2 is a diagram depicting a configuration example of a pixel P included in the pixel unit 104. In FIG. 2, the pixel P (m, n) indicates a pixel that is disposed at the n-th row and m-th column of the pixel unit 104.

The pixel P includes a photodiode (hereafter "PD"), a floating diffusion (hereafter "FD"), a transfer transistor M1, a reset transistor M2, an amplification transistor M3, a selection transistor M4 and a selection transistor M5.

The PD is a photoelectric conversion element that performs photoelectric conversion, generates charges in accordance with the incident light, and stores the generated charges. The transfer transistor M1 transfers the charges from the PD to the FD, which is an input node of the amplification transistor M3. the FD holds the charges transferred via the transfer transistor M1. The reset transistor M2 resets the voltage of the FD to a predetermined voltage. The amplification transistor M3 outputs a signal, based on the potential of the FD which fluctuates in accordance with the transferred charges, to a vertical signal line Vline1 (m) or Vline2 (m) on the m-th column via the selection transistor M4 or the selection transistor M5. In Example 1, the two vertical signal lines Vline1 (m) and Vline2 (m) are connected to one pixel P via the selection transistors M4 and M5 respectively, hence pixel signals can be outputted from the two vertical signal lines. The selection transistors M4 and M5 correspond to the connection circuits to connect the pixel to the vertical signal lines.

A drain of the reset transistor M2 and a drain of the amplification transistor M3 are electrically connected to a pixel power supply VCC. A source of the amplification transistor M3 is electrically connected to a current source (not illustrated) via the selection transistors M4 and M5 and the vertical signals lines Vline1 (m) and Vline2 (m), and operates as a source-follower circuit. In other words, the amplification transistor M3 can output a signal in accordance with the potential of the FD connected to the gate terminal.

Each transistor is constituted of an N channel transistor, but may be constituted of a P channel transistor.

Operation of Pixel P

A signal PTX (n) is a signal to control the transfer transistor M1 on the n-th row, and is inputted to the gate of the transfer transistor. A signal PRES (n) is a signal to control the reset transistor M2 on the n-th row, and is inputted to the gate of the reset transistor. A signal PSEL1 (n) is a signal to control the selection transistor M4 on the n-th row, and is inputted to the gate of the selection transistor. A signal PSEL2 (n) is a signal to control the selection transistor M5 on the n-th row, and is inputted to the gate of the selection transistor. Each transistor becomes conductive state when the signal inputted to the gate is at high level, and becomes non-conductive state when the signal is at low level. These control signals are supplied from the vertical scanning unit 103 to the pixel unit 104 based on the instruction from the control unit 102.

When the pixel P is read, N (noise) data is read first, then S (signal) data is read.

For the N data, after the reset of the FD is cleared, charges of the FD are read via the amplification transistor M3 by controlling the gate voltage of the selection transistor M4 or M5. Here, in the case of reading the charges from the selection transistor M4, the gate voltage of the selection transistor M4 is set to high level, and in the case of reading the charges from the selection transistor M5, the gate voltage of the selection transistor M5 is set to high level.

For the S data, after the N data is read, charges of the PD are transferred to the FD using the transfer transistor M1, and the charges of the FD at this time are read via the amplification transistor M3 by controlling the gate voltage of the selection transistor M4 or M5. Here in the case of reading the charges from the selection transistor M4, the gate voltage of the selection transistor M4 is set to high level, and in the case of reading the charges from the selection transistor M5, the gate voltage of the selection transistor M5 is set to high level.

The reset noise of the FD can be removed from the data of the pixel P by the correlated double sampling processing (S−N), which subtracts the N data from the S data. In Example 1, the operation to read the data of the pixel P by the correlated double sampling processing is called the "read operation". However, it may be configured such that the data of the pixel P is read without performing the correlated double sampling processing.

In the case of the shutter operation of the pixel P, reset of the PD is cleared. The reset of the PD is cleared by changing the input gate of the transfer transistor M1 for the charges of the PD from high level to low level. Hereafter this operation is called the "shutter operation".

Vertical Scanning Circuit

Figure 3:
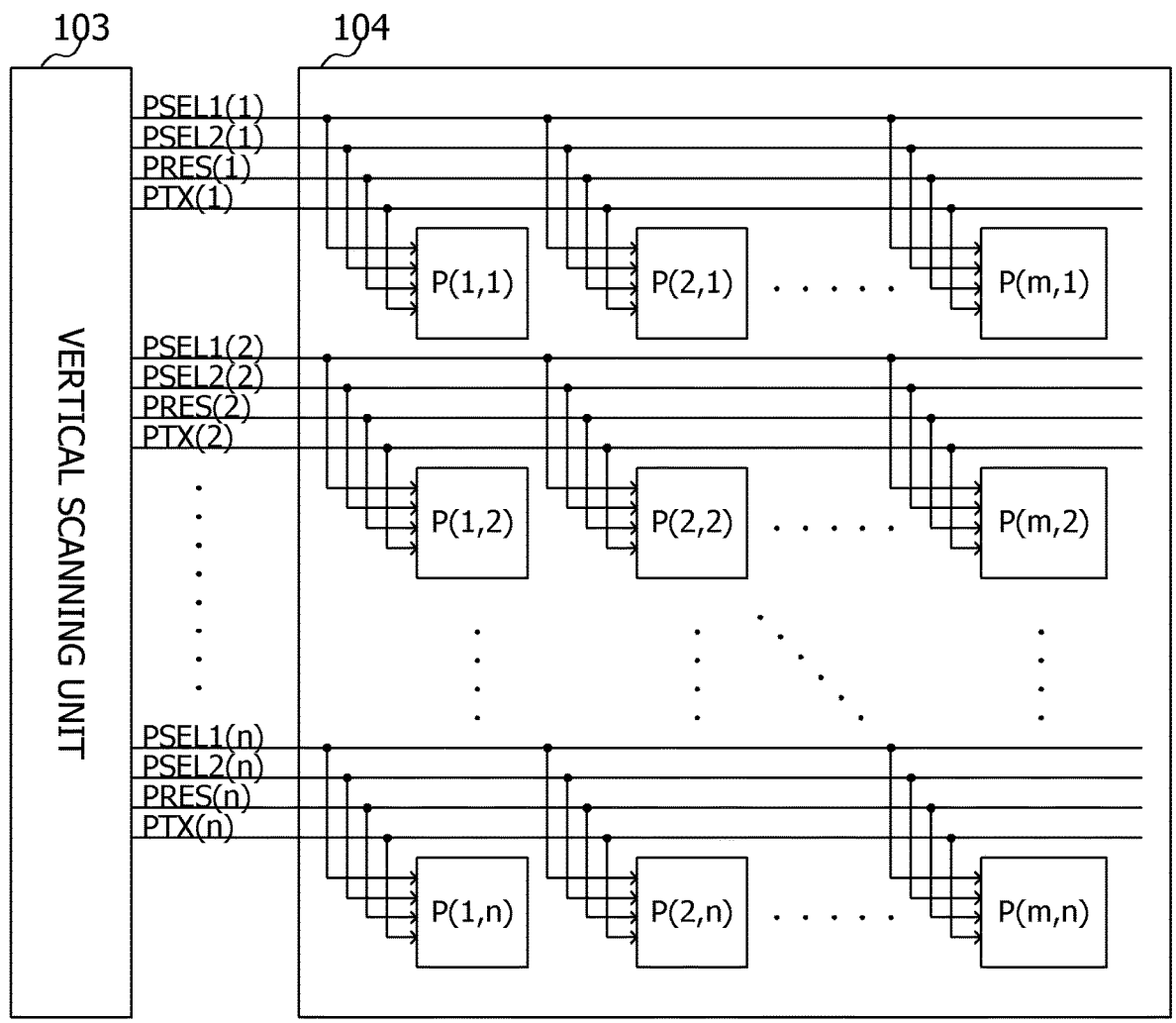
FIG. 3 is a schematic diagram depicting a configuration of a vertical scanning unit 103 and a pixel unit 104 according to Example 1.

FIG. 3 is a schematic diagram depicting a configuration example of the vertical scanning unit 103 and the pixel unit 104 according to Example 1. The vertical scanning unit 103 outputs signals PTX (k), PRES (k), PSEL1 (k) and PSEL2 (k) (k: 1 to n). The signals PTX (k), PRES (k), PSEL1 (k) and PSEL2 (k), outputted from the vertical scanning unit, are connected to a pixel P (m, k) (k: 1 to n) disposed on the k-th row. By controlling the signals PTX (k), PRES (k), PSEL1 (k) and PSEL2 (k), the vertical scanning unit 103 can cause the pixels on the k-th row to perform the shutter operation and the read operation.

Column Configuration

Figure 4A:
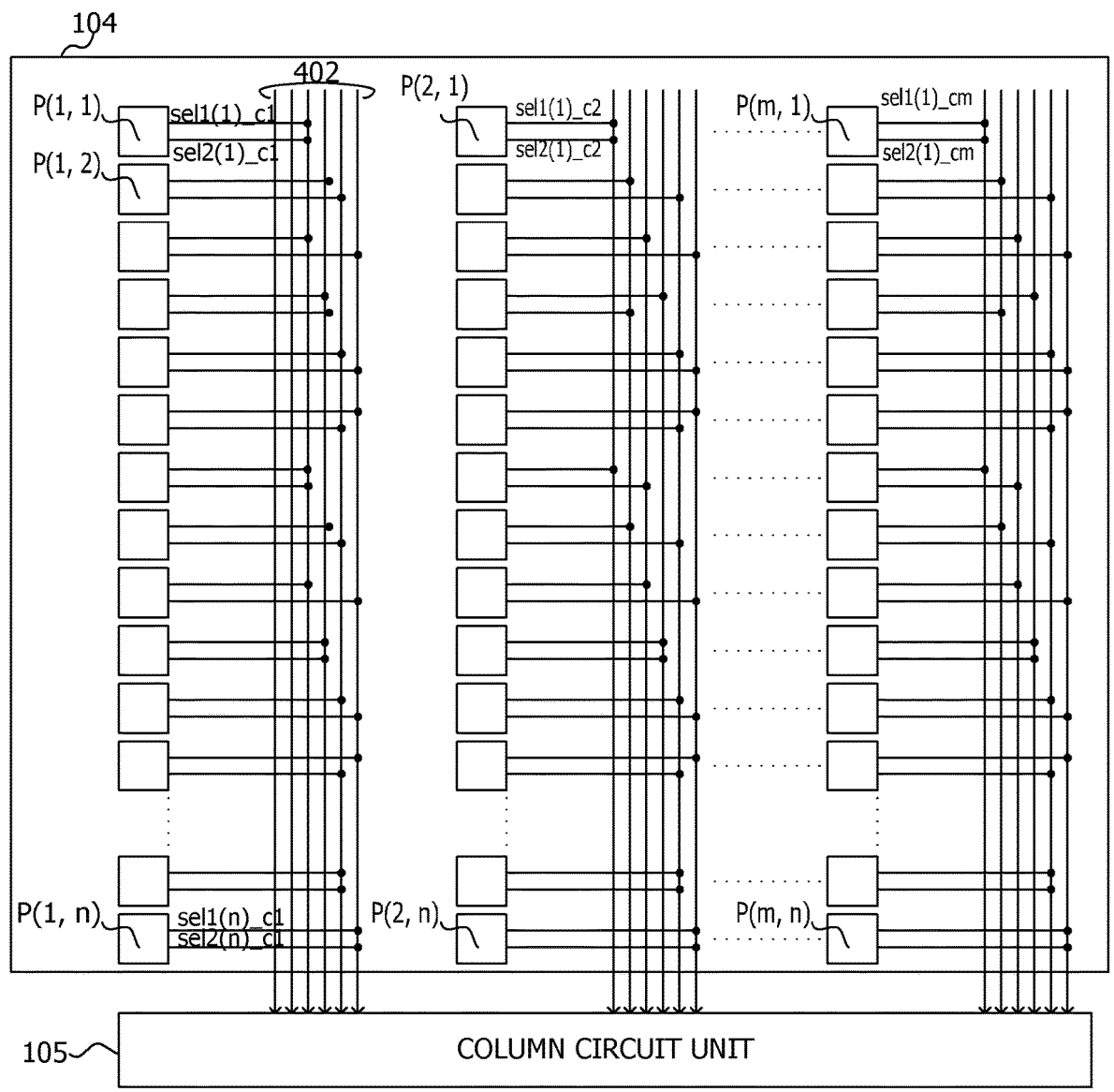
FIG. 4A is a schematic diagram depicting a configuration of the pixel unit 104 and peripheral circuits according to Example 1.

FIG. 4A is a schematic diagram depicting a configuration example of the pixel unit 104 and the column circuit unit 105 according to Example 1. The pixel unit 104 has pixels P on each column. The pixel unit 104 also has vertical signal lines 402 which are connected to the pixels on each column.

The selection transistor M4 disposed in the pixel P (m, n) on the m-th column and the n-th row and the vertical signal line 402 are connected by the signal line sel1 (n)_cm, and the selection transistor M5 disposed in the pixel P (m, n) and the vertical signal line 402 are connected by a signal line sel2 (n)_cm.

Vertical signal lines 402 are connected to a constant current source (not illustrated). The vertical signal lines 402 are also connected to the column circuit unit 105. In Example 1, 6 vertical signal lines 402 are disposed for each column. Further, in Example 1, the 6 vertical signal lines connected to the pixels on the first column are denoted by c1_vl #(#: 1 to 6), and the 6 vertical signal lines connected to the pixels on the m-th column are denoted by cm_vl #.

FIG. 4B is a table for briefly explaining the connection relationship between the selection transistors (output signal lines) of each pixel and the vertical signal lines.

Connection Between Selection Transistor M4 of Pixel P and Vertical Signal Line

Connection between the pixel P (m, n) and the vertical signal line 402 via the selection transistor M4 will be described. The output signal line sel1 (n)_cm of the selection transistor M4 of the pixel P (m, n) and the vertical signal line cm_vl #(#: 1 to 6) are connected as follows.

The signal line sel1 (1)_ck of the pixel P (k, 1) on the first row is connected with the vertical signal line ck_vl1 (k: 1 to m).

The signal line sel1 (2)_ck of the pixel P (k, 2) on the second row is connected with the vertical signal line ck_vl2 (k: 1 to m).

The signal line sel1 (3)_ck of the pixel P (k, 3) on the third row is connected with the vertical signal line ck_vl3 (k: 1 to m).

In this way, the signal line on each row is sequentially connected with each of the 6 vertical signal lines, and this connected is repeated in a 6-row cycle.

Connection with the vertical signal lines ck_vl1, ck_vl2, ck_vl3, ck_vl4, ck_vl5 and ck_vl6 (k: 1 to m) need not be in a row sequence all the time, as long as each of ck_vl1 to ck_vl6 is connected once to the selection transistor M4 of the pixel P every continuous 6 rows. In other words, required here is that each of the vertical signal lines is connected once to the pixel P via the selection transistor M4 every 6 rows.

Connection Between Selection Transistor M5 of Pixel P and Vertical Signal Line

Connection between the pixel P (m, n) and the vertical signal line 402 via the selection transistor M5 will be described. The output signal line sel2 (n)_cm of the selection transistor M5 of the pixel P (m, n) and the vertical signal line cm_vl #(#: 1 to 6) are connected as follows. The connection will be described separately for the case of the vertical signal lines cm_vl #(#: 1 to 4) and the case of the vertical signal lines cm_vl #(#: 5 and 6).

Here the 6 vertical signal lines are separated into 4 lines and 2 lines, but in the case of disposing L number of (L is 3 or greater integer) vertical signal lines on each pixel column, the vertical signal lines may be separated into 2 groups of P number of lines (P is an integer that is at least 1 and not greater than L−1) and (L−P) number of lines.

The vertical signal lines cm_vl #(#: 1 to 4) are connected as follows.

The signal line sel2 (1)_k of the pixel P (k, 1) on the first row is connected with the vertical signal line ck_vl1 (k: 1 to m).

The signal line sel2 (4)_k of the pixel P (k, 4) on the fourth row is connected with the vertical signal line ck_vl2 (k: 1 to m).

The signal line sel2 (7)_k of the pixel P (k, 7) on the seventh row is connected with the vertical signal line ck_vl3 (k: 1 to m).

The signal line sel2 (10)_k of the pixel P (k, 10) on the tenth row is connected with the vertical signal line ck_vl4 (k: 1 to m).

In other words, the vertical signal lines cm_vl #(#: 1 to 4) are sequentially connected with the output signal lines of the selection transistor M5 of the pixel P every 3 rows. This connection at one cycle constituted of 12 rows is periodically repeated.

In Example 1, the connection is performed every 3 rows, but the connection need not be every 3 rows all the time, and may be every S rows (S is 2 or greater integer) when needed. The above description of Example 1 is a case of S=3. Further, the vertical signal lines are sequentially connected as in ck_vl1, ck_vl2, ck_vl3, and ck_vl4 every 3 rows in the above description, but the connection need not be in this sequence all the time, as long as each of the vertical signal lines ck_vl1 to ck_vl4 is connected once to the selection transistor M5 of the pixel P respectively within S×4 rows (S is 2 or greater natural number). In other words, required here is that each of the vertical signal lines ck_vl #(#: 1 to 4) is connected once to the selection transistor M5 of the pixel P every S×4 rows. In the above description, the 4 vertical signal lines cm_vl #(#: 1 to 4) constitute one group (P=4), therefore connection is performed every S×4 rows, but generally each vertical signal line is connected every S×P rows.

The vertical signal lines cm_vl #(#: 5 and 6) are connected as follows.

The signal line sel2 (2)_k of the pixel P (k, 2) on the second row is connected with the vertical signal line ck_vl5 (k: 1 to m).

The signal line sel2 (5)_k of the pixel P (k, 5) on the fifth row is connected with the vertical signal line ck_vl6 (k: 1 to m).

In other words, the vertical signal lines cm_vl #(#: 5 and 6) are alternately connected with the output signal line of the selection transistor M5 of the pixel P every 3 rows. This connection at one cycle constituted of 6 rows is periodically repeated.

In Example 1, the connection is performed every 3 rows, but the connection need not be every 3 rows all the time, and may be every S rows (S is 2 or greater integer) when needed. The above description of Example 1 is a case of S=3. Further, the vertical signal lines are sequentially connected as in ck_vl5 and ck_vl6 every 3 rows, but the connection need not be in this sequence all the time, as long as each of the vertical signal lines ck_vl5 and ck_vl6 is connected once to the selection transistor M5 of the pixel P respectively within S×2 rows (S is 2 or greater natural number). In other words, required here is that each of the vertical signal lines ck_vl #(#: 5 and 6) is connected once with the selection transistor M5 of the pixel P every S×2 rows. In the above description, 2 lines (6-4 lines) of the vertical signal lines cm_vl #(#: 5 and 6) constitute one group, therefore connection is performed every S×2 rows, but generally each vertical signal line is connected every S×(L−P) rows (L=6 and P=4 in this example).

Rows not described above ((3n+3)-th (n is 0 or greater integer) row) may be connected with any vertical signal line, or may not be connected with any vertical signal line.

For example, ck_vl5 may be connected with the (6n+3)-th row (n is 0 or greater integer), and ck_vl6 may be connected with the (6n+6)-th row (n is 0 or greater integer). FIGS. 4A and 4B indicate this connection method. If this connection method is used, a number of selection transistors M4 and M5 of the pixels connected with each of the 6 vertical signal lines becomes the same. Therefore, the transistor capacity connected to each vertical signal line can be equalized.

Further, if this connection method is used, the pixel signals of a plurality of rows can be analog-added and read. In other words, the vertical signal line ck_vl5 can output a signal generated by analog-adding the pixel signal of the (6n+2)-th row (n is 0 or greater integer) and the pixel signal of the (6n+3)-th row. In the same manner, the vertical signal line ck_vl6 can output a signal generated by analog-adding the pixel signal of the (6n+5)-th row (n is 0 or greater integer) and the pixel signal of the (6n+5)-th row.

As another example, the pixel of the (3n+3)-th row and the vertical signal line may be connected as follows.

(12n+3)-th row (n is 0 or greater integer): ck_vl1 is connected (12n+6)-th row (n is 0 or greater integer): ck_vl2 is connected (12n+9)-th row (n is 0 or greater integer): ck_vl3 is connected (12n+12)-th row (n is 0 or greater integer): ck_vl4 is connected If this connection method is used, the pixel signals can be analog-added on the vertical signal lines ck_vl1 to ck_vl4. In this case, ck_vl1 can output a signal generated by analog-adding the pixel signal of the (12n+1)-th row and the pixel signal of the (12n+3)-th row. In the same manner, ck_vl2 can output a signal generated by analog-adding the pixel signals of the (12n+4)-th row and the (12n+6)-th row, ck_vl3 can output a signal generated by analog-adding the pixel signals of (12n+7)-th row and the (12n+9)-th row, and ck_vl4 can output a signal generated by analog-adding the pixel signals of the (12n+10)-th row and the (12n+12)-th row.

Operation Sequence 1

Figure 5:
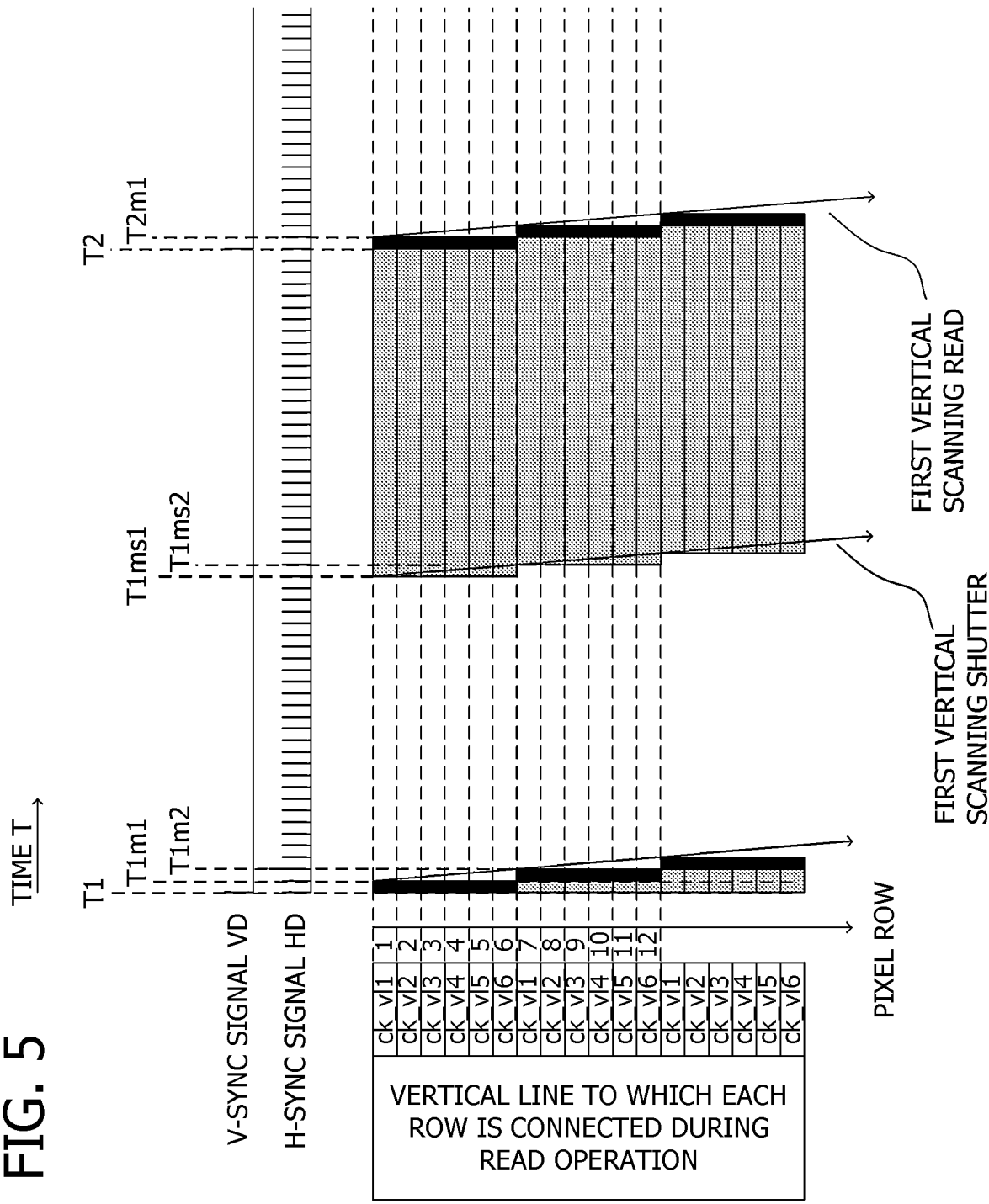
FIG. 5 is an overview of timing chart 1 according to Example 1.

FIG. 5 is a timing chart indicating an example of a vertical scanning operation in a first operation mode according to Example 1. In the first operation mode, the vertical scanning unit 103 performs only a single vertical scanning operation (read scanning) at one timing using the selection transistor M4.

In this example, the image data from the first row to the N-th row (N: 1 or greater natural number) is acquired in the first vertical scanning operation. In the case of acquiring the image data by the read scanning operation, only the selection transistor M4 of each pixel P is used, and the pixel signals are read from the 6 vertical signal lines disposed on each column.

In the first frame (time T1 to time T2) only the first vertical scanning operation is executed. At time T1, the read operation of the first vertical scanning operation is started. In the period from time T1 to time T1m1, charges of the PDs of the pixels P on the first row to the sixth row are read. Here the vertical scanning unit 103 controls PTX (k), PRES (k), PSEL1 (k) and PSEL2 (k) (k: 1 to 6), whereby the read operation from the selection transistor M4 of each pixel P is performed. A read signal from each pixel is read via sel1 (k)_p (k: 1 to 6; p: 1 to m). Specifically, the pixel signals on the first row are read from the vertical signal line cp_vl1, and the pixel signals on the second row are read from the vertical signal line cp_vl2. The pixel signals on the third row are read from the vertical signal line cp_vl3, and the pixel signals on the fourth row are read from the vertical signal line cp_vl4. Further, the pixel signals on the fifth row are read from the vertical signal line cp_vl5, and the pixel signals on the sixth row are read from the vertical signal line cp_vl6.

Then in the period from time T1m1 to time T1m2, charges of the PD of each pixel P on the seventh row to the twelfth row are read from the 6 vertical signal lines disposed on each column as pixel signals respectively. Here the vertical scanning unit 103 controls PTX (k), PRES (k), PSEL1 (k) and PSEL2 (k) (k: 7 to 12), whereby the read operation from the selection transistor M4 of the pixel P is performed. The read signal from each pixel is read via sel1 (k)_p (k: 1 to 6, p: 1 to m). Specifically, the pixel signals on the seventh row are read from the vertical signal line cp_vl1, and the pixel signals on the eighth row are read from the vertical signal line cp_vl2. The pixel signals on the ninth row are read from the vertical signal line cp_vl3, and the pixel signals on the tenth row are read from the vertical signal line cp_vl4. Further, the pixel signals on the eleventh row are read from the vertical signal line cp_vl5, and the pixel signals on the twelfth row are read from the vertical signal line cp_vl6.

Thereafter the read scanning operation is sequentially performed for 6 rows at a time, synchronizing with the horizontal synchronizing signal HD.

In the first frame, the shutter operation (reset of the PD is cleared) corresponding to the reading of the first vertical scanning operation in the second frame is performed. At time T1ms1, the shutter operation of the first vertical scanning operation is started. In the period from time T1ms1 to the time T1ms2, reset of the PD is cleared for the pixels P on the first row to the sixth row. Thereafter the shutter scanning operation is sequentially performed for 6 rows at a time, synchronizing with the horizontal synchronizing signal HD.

In the same manner, an example of executing only the first vertical scanning operation is indicated for the second frame (time T2 to time T3) as well.

Operation Sequence 2

Figure 6:
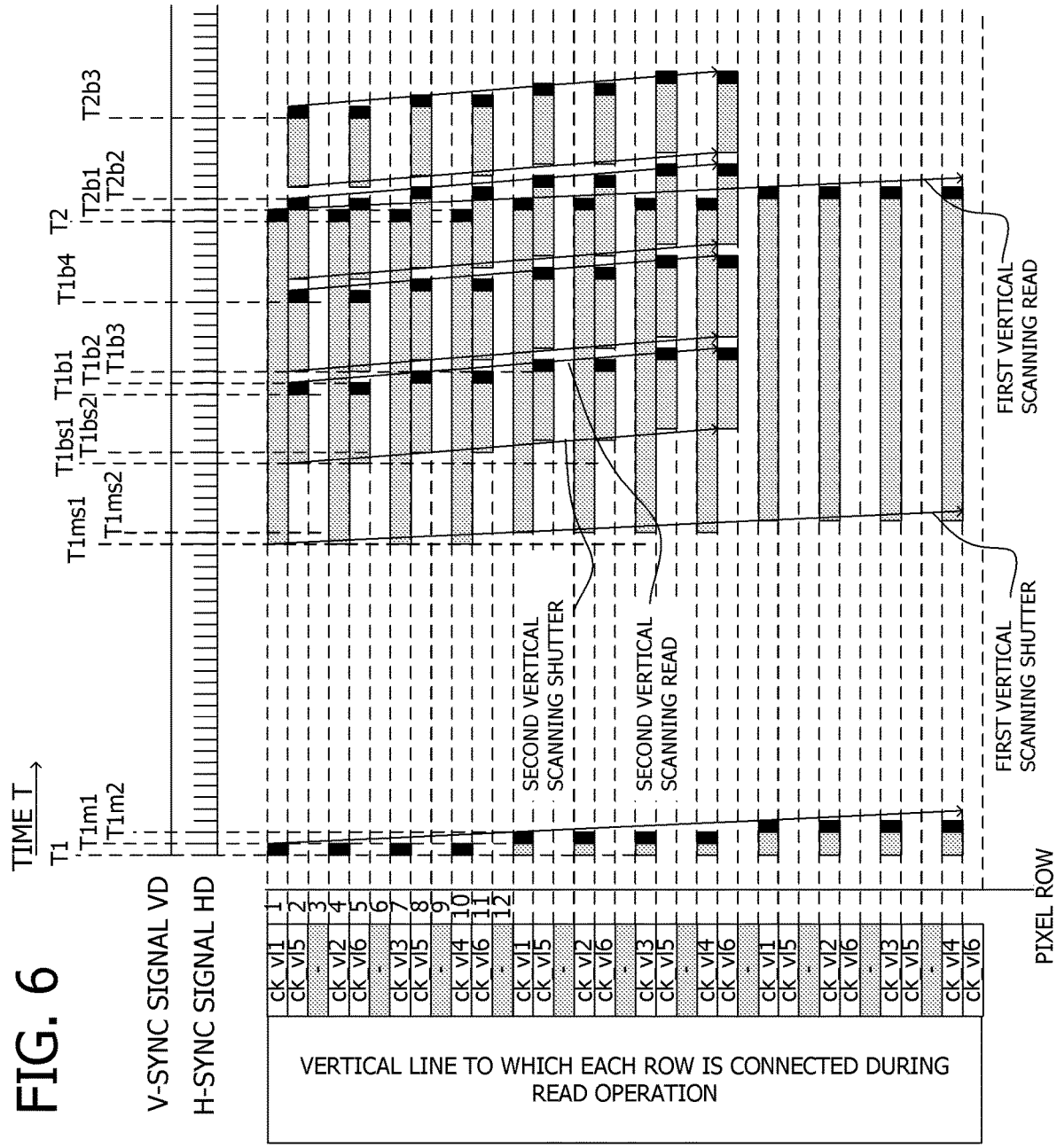
FIG. 6 is an overview of timing chart 2 according to Example 1.

FIG. 6 is a timing chart indicating an example of a vertical scanning operation in a second operation mode according to Example 1. In the second operation mode, the vertical scanning unit 103 performs a plurality of vertical scanning operations (read scanning) at one timing using the selection transistor M5. In this example, the image data from the second row to the (3L+2)-th row (L: 1 or greater natural number) is acquired in the second vertical scanning while acquiring the image data from the first row to the (3N+1)-th row (N: 1 or greater natural number) in the first vertical scanning operation. The images acquired in the first vertical scanning operation are used as the images captured for live view, and the images acquired in the second vertical scanning operation are used as the images for flicker detection, for example.

The first vertical scanning operation (first read scanning) and the second vertical scanning operation (second read scanning) in the second operation mode have the following differences. The scanning cycle of the first vertical scanning operation is longer than the scanning cycle of the second vertical scanning operation. Further, while the first vertical scanning operation is performed once, the second vertical scanning operation is performed for a plurality of times. Further, a number of pixel rows that are read by one scanning operation is different, that is, a number of pixel rows that are read by the first vertical scanning operation is more than a number of pixel rows that are read by the second vertical scanning operation. Furthermore, the first vertical scanning operation is executed periodically, while the second vertical scanning operation is executed intermittently or non-periodically. A number of the rows to be skipped in the reading of the first vertical scanning operation and that of the second vertical scanning operation are the same in Example 1, but may be different. The first vertical scanning operation and the second vertical scanning operation need not be different from each other in all aspects, but may be executed under the same conditions in some of these aspects. In the present disclosure, a vertical scanning operation, executed under conditions which are different from the above conditions, is regarded as a different vertical scanning operation, and a vertical scanning operation, executed under conditions which are the same as or similar in all the above conditions, is regarded as the same vertical scanning operation.

In the case of acquiring image data by the read scanning, only the selection transistor M5 of each pixel P is used, and pixel signals are read from the 6 vertical signal lines disposed on each column. Here in the reading by the first vertical scanning operation, 4 lines (cp_vl1, cp_vl2, cp_vl3 and cp_vl4), out of the 6 vertical signal lines disposed on each column, are used. In the reading by the second vertical scanning operation, 2 lines (cp_vl5 and cp_vl6) (p: 1 to m), out of the 6 vertical signal lines disposed on each column, are used.

The first frame (time T1 to time T2) is an example of executing the first vertical scanning operation (once) and the second vertical scanning operation (shutter scanning operation three times, read scanning operation two times).

At time T1, the read operation of the first vertical scanning operation is started. In the period from time T1 to time T1m1, the charges of the PD of each pixel P on the 4 rows (first row, fourth row, seventh row and tenth row) are read. Here the read operation from the selection transistor M5 of each pixel P is performed by the vertical scanning unit controlling PTX (k), PRES (k), PSEL1 (k) and PSEL2 (k) (k: 1, 4, 7 and 10). The read signal from each pixel is read via sel2 (k)_p (k: 1, 4, 7, 10; p: 1 to m). Specifically, the pixel signals on the first row are read from the vertical signal line cp_vl1, and the pixel signals on the fourth row are read from the vertical signal line cp_vl2. The pixel signals on the seventh row are read from the vertical signal line cp_vl3, and the pixel signals on the tenth row are read from the vertical signal line cp_vl4.

Then in the period from time T1m1 to time T1m2, the charges of the PD of each pixel P on the four rows (thirteenth row, sixteenth row, nineteenth row, twenty second row) are read. Here the read operation from the selection transistor M5 of each pixel P is performed by the vertical scanning unit controlling PTX (k), PRES (k), PSEL1 (k) and PSEL2 (k) (k: 13, 16, 19, and 22). Specifically, the read signal from each pixel is read via sel2 (k)_p (k: 13, 16, 19 and 22; p: 1 to m). The pixel signals on the thirteenth row are read from the vertical signal line cp_vl1, and the pixel signals on the sixteenth row are read from the vertical signal line cp_vl2. The pixel signals on the nineteenth row are read from the vertical signal line cp_vl3, and the pixel signals on the twenty second row are read from the vertical signal line cp_vl4.

Thereafter the read scanning operation is sequentially performed for 4 rows at a time, with one row interval every 3 rows, synchronizing with the horizontal synchronizing signal HD.

In the first frame, the shutter operation (reset of PD is cleared), corresponding to the reading of the first vertical scanning operation in the second frame, is performed.

At time T1ms1, the shutter operation of the first vertical scanning operation is started. In the period from time T1ms1 to time T1ms2, reset of the PD is cleared for the pixels P on the 4 rows (first row, fourth row, seventh row and tenth row). Thereafter the shutter scanning operation is sequentially performed for 4 rows at a time with a one row interval every 3 rows, synchronizing with the horizontal synchronizing signal HD.

Then in parallel with the first vertical scanning operation, the shutter operation of the second vertical scanning operation (first time) is performed. At time T1bs1, the shutter operation of the second vertical scanning operation is started. In the period from T1bs1 to time T1bs2, reset of the PD is cleared for the pixels P on 2 rows (second row and fifth row). Thereafter the shutter scanning operation is sequentially performed for 2 rows at a time with a one row interval every 3 rows, synchronizing with the horizontal synchronizing signal HD.

Then the read operation of the second vertical scanning operation (first time) is performed.

At time T1b1, the read operation of the second vertical scanning operation is started. In the period from time T1b1 to time T1b2, charges of the PD of each pixel P on the 2 rows (second row and fifth row) are read. Here the read operation from the selection transistor M5 of each pixel P is performed by the vertical scanning unit controlling PTX (k), PRES (k), PSEL1 (k) and PSEL2 (k) (k: 2 and 5). The read signal from each pixel is read via sel2 (k)_p (k: 2 and 5; p: 1 to m). Specifically, the pixel signals on the second row are read from the vertical signal line cp_vl5, and the pixel signals on the fifth row are read from the vertical signal line cp_vl6.

Then in the period from time T1b2 to time T1b3, charges of the PD of each pixel P on the 2 rows (eighth row and eleventh row) are read. Here the read operation from the selection transistor M5 of each pixel P is performed by the vertical scanning unit controlling PTX (k), PRES (k), PSEL1 (k) and PSEL2 (k) (k: 8 and 11). The read signal from each pixel is read via sel2 (k)_p (k: 8 and 11; p: 1 to m). Specifically, the pixel signals on the eighth row are read from the vertical signal line cp_vl5, and the pixel signal on the eleventh row are read from the vertical signal line cp_vl6.

Thereafter the read scanning operation is sequentially performed for 2 rows at a time, with a one row interval every 3 rows, synchronizing with the horizontal synchronizing signal HD.

At time T1b4, the read operation of the second vertical scanning operation (second time) is performed. The content of the read scanning operation is the same as the first time, hence the description thereof is omitted.

In the same manner, in the second frame (time T2 to time T3), the first vertical scanning operation (once) and the second vertical scanning operation (shutter scanning operation one time, read scanning operation two times) are executed. At time T2, the read operation of the first vertical scanning operation is started. The subsequent read operation is the same as that in the first frame.

Then in parallel with the read operation of the first vertical scanning operation, the read operation of the second vertical scanning operation (the third time, including the first frame) starts at time T2b1.

Then the shutter operation of the second vertical scanning operation (fourth time, including the first frame) starts at time T2b1. The subsequent shutter operation is the same as the first frame.

Further, the read operation of the second vertical scanning operation (fourth time, including the first frame) starts at time T2b1. The subsequent read operation is the same as the first frame.

The number of times of the first vertical scanning operation and that of the second vertical scanning operation are merely example, and any combination of the number of times may be used. Further, either one or both of the number of times of the first vertical scanning operation and that of the second vertical scanning operation may be changed in each frame, or either one of the vertical scanning operations may not be performed in each frame.

Advantageous Effects of Example 1

According to the configuration of Example 1, the mode in which only the reading by the first vertical scanning operation is performed, and the mode in which the reading by the first vertical scanning operation and the reading by the second vertical scanning operation are concurrently performed can be implemented. Here various read methods can be implemented without imposing major restrictions on the hardware of the solid-state imaging apparatus. Even if a number of vertical signal lines to be used increases, the vertical read scanning operation can be performed using all the vertical signal lines.

Example 2

In Example 1, one photodiode PD is connected to one floating diffusion FD, but in Example 2, a plurality of PDs are connected to one FD. In Example 2, a case of connecting 2 PDs to one FD will be described, however more PDs may be connected to one FD. The general configuration of the solid-state imaging apparatus 1 is the same as Example 1 (FIG. 1).

Pixel P

Figure 7:
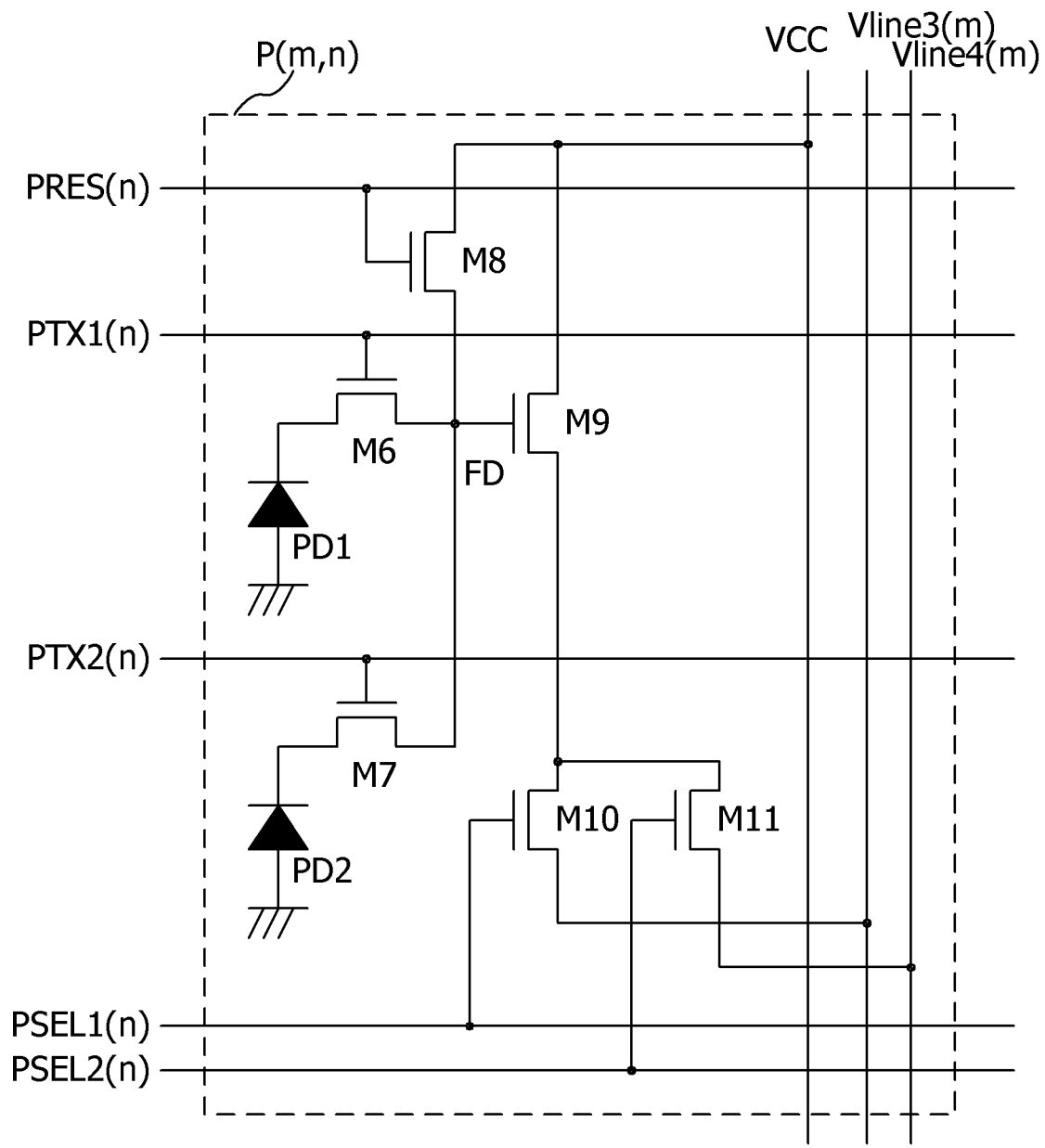
FIG. 7 is an equivalent circuit diagram of a pixel according to Example 2.

FIG. 7 is a diagram depicting a configuration example of a pixel P included in the pixel unit 104 of Example 2. In FIG. 7, the pixel P (m, n) indicates a pixel that is disposed at the n-th row and m-th column of the pixel unit 104.

The pixel P includes photodiodes PD1 and PD2, an FD, transfer transistors M6 and M7, a reset transistor M8, an amplification transistor M9, a selection transistor M10, and a selection transistor M11.

The photodiodes PD1 and PD2 are photoelectric conversion elements that perform photoelectric conversion, generate charges in accordance with the incident light, and store the generated charges. The transfer transistor M6 transfers the charges from the PD1 to the FD, which is an input node of the amplification transistor M9. The transfer transistor M7 transfers the charges from the PD2 to the FD, which is an input node of the amplification transistor M9. The FD holds the charges of the PD1 transferred via the transfer transistor M6, or the charges of the PD2 transferred via the transfer transistor M7. The reset transistor M8 resets the voltage of the FD to a predetermined voltage. The amplification transistor M9 outputs a signal, based on the potential of the FD which fluctuates in accordance with the transferred charges, to vertical signal lines Vline3 (m) or Vline4 (m) on the m-th column via the selection transistor M10 or the selection transistor M11. It may be regarded that the selection transistors M10 and M11 connect the FD to the vertical signal line via the amplification transistor M9.

A drain of the reset transistor M8 and a drain of the amplification transistor M9 are electrically connected to a pixel power supply VCC. A source of the amplification transistor M9 is electrically connected to a current source (not illustrated) via the selection transistors M10 and M11, and the vertical signal lines Vline3 (m) and Vline4 (m), and operates as a source-follower circuit. In other words, the amplification transistor M9 can output a signal in accordance with the potential of the FD connected to the gate terminal.

Each transistor is constituted of an N-channel transistor, but may be constituted of a P-channel transistor.

Operation of Pixel P

A signal PTX1 (n) is a signal to control the transfer transistor M6 on the n-th row, and is inputted to the gate of the transfer transistor. A signal PTX2 (n) is a signal to control the transfer transistor M7 on the n-th row, and is inputted to the gate of the transfer transistor. A signal PRES (n) is a signal to control the reset transistor M8 on the n-th row, and is inputted to the gate of the reset transistor. A signal PSEL1 (n) is a signal to control the selection transistor M10 on the n-th row, and is inputted to the gate of the selection transistor. A signal PSEL2 (n) is a signal to control the selection transistor M11 on the n-th row, and is inputted to the gate of the selection transistor. Each transistor becomes conductive state when the signal inputted to the gate is at high level, and becomes non-conductive state when the signal is at low level.

When the pixel P is read, N (noise) data is read first, then S (signal) data is read.

For the N data, after the reset of the FD is cleared, charges of the FD are read via the amplification transistor M9 by controlling the gate voltage of the selection transistor M10 or M11. Here in the case of reading the charges from the selection transistor M10, the gate voltage of the selection transistor M10 is set to high level, and in the case of reading the charges from the selection transistor M11, the gate voltage of the selection transistor M11 is set to high level.

For the S data, after the N data is read, charges of the PD1 are transferred to the FD using the transfer transistor M6 if the charges of the PD1 are read, and charges of the PD2 are transferred to the FD using the transfer transistor M7 if the charges of the PD2 are read. The charges of the FD at this time are read via the amplification transistor M9 by controlling the gate voltage of the selection transistor M10 or M11. Here in the case of reading the charges from the selection transistor M10, the gate voltage of the selection transistor M10 is set to high level, and in the case of reading the charges from the selection transistor M11, the gate voltage of the selection transistor M11 is set to high level.

The reset noise of the FD can be removed from the data of the pixel P by the correlated double sampling processing (S–N), which subtracts the N data from the S data. In Example 2, the operation to read the data of the pixel P by the correlated double sampling processing is called the "read operation". However, it may be configured such that the data of the pixel P is read without performing the correlated double sampling processing.

In the case of the shutter operation of the pixel P, the reset of the PD1 and PD2 is cleared. The reset of the PD1 is cleared by changing the input gate of the transfer transistor M6 for the charges of the PD1 from the high level to the low level, and the reset of the PD2 is cleared by changing the input gate of the transistor M7 for the charges of the PD2 from the high level to the low level. Hereafter this operation is called the "shutter operation".

Vertical Scanning Circuit

Figure 8:
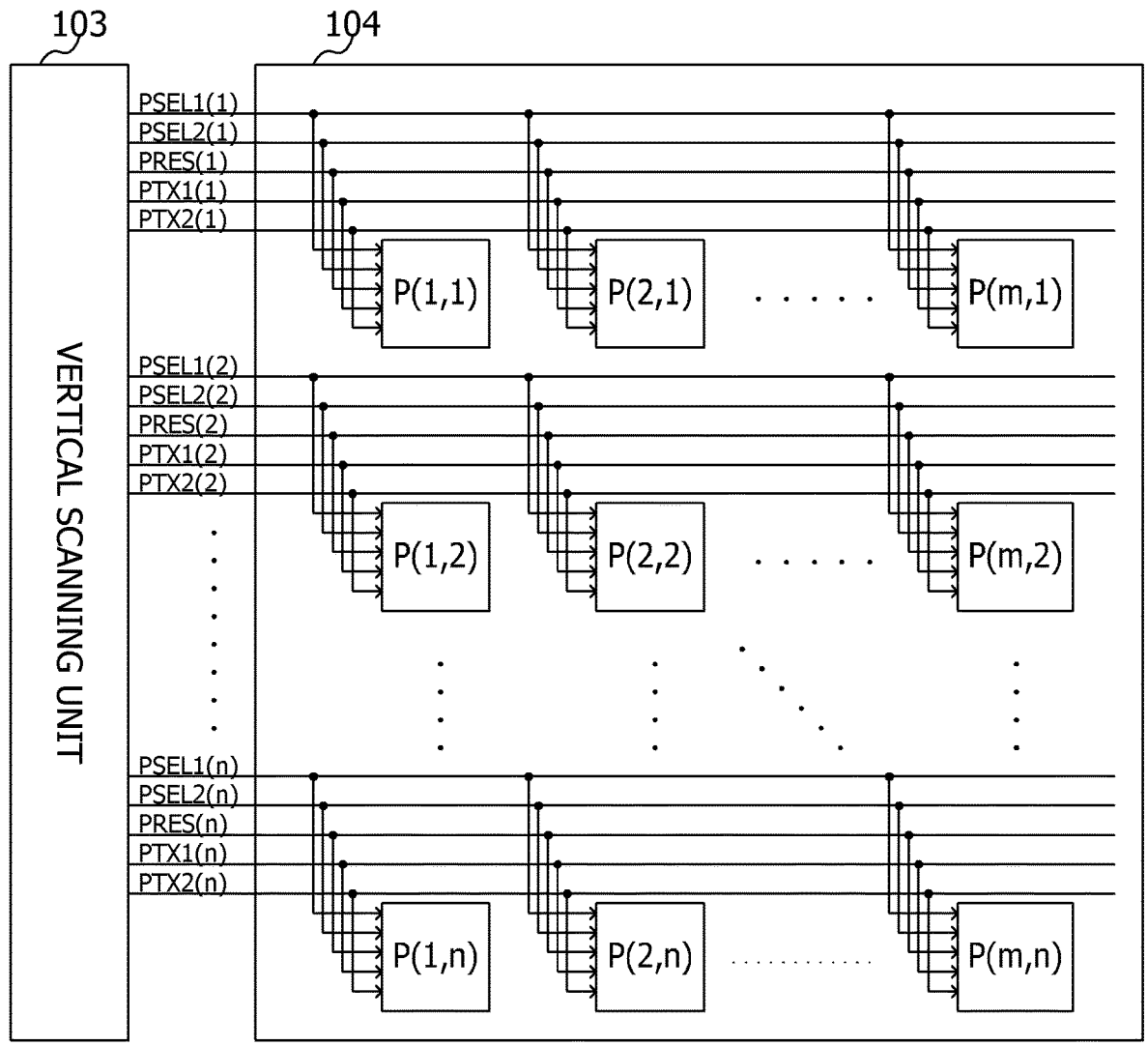
FIG. 8 is a schematic diagram depicting a configuration of the vertical scanning unit 103 and the pixel unit 104 according to Example 2.

FIG. 8 is a schematic diagram depicting a configuration example of the vertical scanning unit 103 and the pixel unit 104 according to Example 2. The difference from Example 1 is that a number of signals connected to the transfer transistor of each pixel is not one but two (PTX1 (k) (k: 1 to n) and PTX2 (k) (k: 1 to n)).

The vertical scanning unit 103 outputs signals PTX1 (k), PTX2 (k), PRES (k), PSEL1 (k) and PSEL2 (k) (k: 1 to n). The signals PTX1 (k), PTX2 (k), PRES (k), PSEL1 (k) and PSEL2 (k) outputted from the vertical scanning unit 103 are connected to a pixel P (m, k) (k: 1 to n) disposed on the k-th row.

By controlling the signals PTX1 (k), PTX2 (k), PRES (k), PSEL1 (k) and PSEL2 (k) (k is 1 or greater natural number), the vertical scanning unit 103 can cause the pixels on the k-th row to perform the shutter operation and the read operation.

Column Configuration

The configuration of a column, that is, the connection relationship of each pixel, the vertical signal lines and the column circuit unit, is basically the same as Example 1 (FIG. 4A). Differences from Example 1 are that the selection transistor M10 of each pixel P (m, n) and the vertical signal lines 402 are connected via a signal line sel1 (n)_cm, and that the selection transistor M11 of each pixel P (m, n) and the vertical signal lines 402 are connected via the signal line sel2 (n)_cm.

Operation Sequence 1

Figure 9:
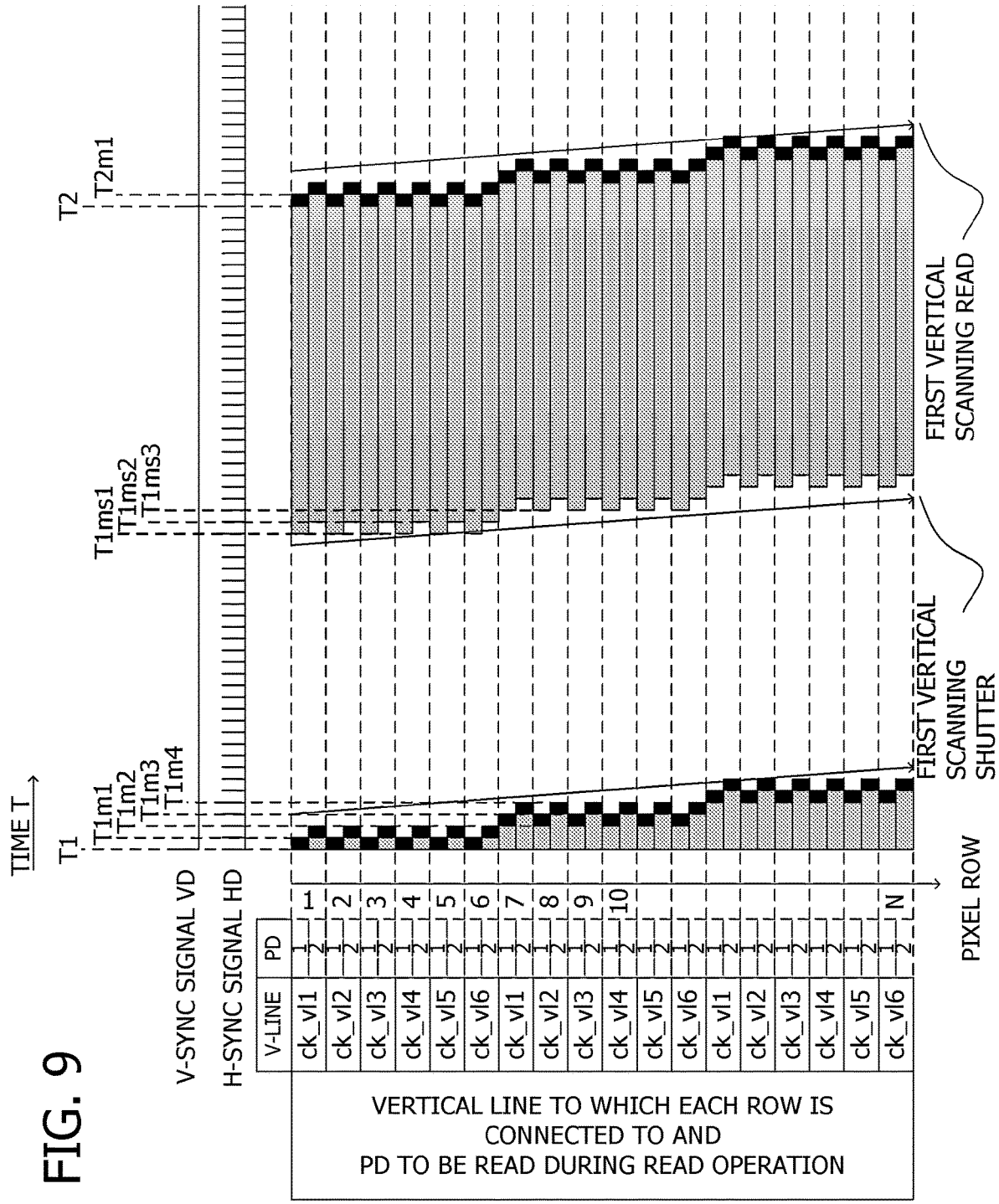
FIG. 9 is an overview of timing chart 1 according to Example 2.

FIG. 9 is a timing chart indicating an example of a vertical scanning operation in a first operation mode according to Example 2. In the first operation mode, the vertical scanning unit 103 performs only a single vertical scanning operation (read scanning) at one timing using the selection transistor M4.

In this example, image data from the first row to the N-th row (N: 1 or greater natural number) is acquired in the first vertical scanning operation. In the case of acquiring the image data by the read scanning operation, only the selection transistor M10 of each pixel P is used, and the pixel signals are read from the 6 vertical signal lines disposed on each column.

In the first frame (time T1 to time T2), only the first vertical scanning operation is executed. At time T1, the read operation of the first vertical scanning operation is started. In the period from time T1 to time T1$m$1, charges of the PD1 of the pixels P on the first row to the sixth row are read. Here the vertical scanning unit controls PTX1 (k), PTX2 (k), PRES (k), PSEL1 (k) and PSEL2 (k) (k: 1 to 6), whereby the read operation from the selection transistor M10 of each pixel P is performed. The read signal from each pixel is read via sel1 (k)_p (k: 1 to 6; p: 1 to m). Specifically, the pixel signals on the first row are read from the vertical signal line cp_vl1, and the pixel signals on the second row are read from the vertical signal line cp_vl2. The pixel signals on the third row are read from the vertical signal line cp_vl3, and the pixel signals on the fourth row are read from the vertical signal line cp_vl4. Further, the pixel signals on the fifth row are read from the vertical signal line cp_vl5, and the pixel signals on the sixth row are read from the vertical signal line cp_vl6.

Then in a period from time T1$m$1 to the time T1$m$2, charges of the PD2 of each pixel P on the first row to the sixth row are read. Here the vertical scanning unit controls PTX1 (k), PTX2 (k), PRES (k), PSEL1 (k) and PSEL2 (k) (k: 1 to 6), whereby the read operation from the selection transistor M10 of the pixel P is performed. The read signal from each pixel is read via sel1 (k)_p (k: 1 to 6; p: 1 to m). Specifically, the pixel signals on the first row are read from the vertical signal line cp_vl1, and the pixel signals on the second row are read from the vertical signal line cp_vl2. The pixel signals on the third row are read from the vertical signal line cp_vl3, and the pixel signals on the fourth row are read from the vertical signal line cp_vl4. Further, the pixel signals on the fifth line are read from the vertical signal line cp_vl5, and the pixel signals on the sixth row are read from the vertical signal line cp_vl6.

Thereafter signals of the PD1 and PD2 of each pixel for 6 rows are sequentially read, synchronizing with the horizontal synchronizing signal HD, for every 2 HDs. Here out of the period of 2 HDs of the horizontal synchronizing signals, charges of the PD1 of each pixel P are read for 6 rows in the first HD, and charges of the PD2 of each pixel P are read for the same 6 rows in the second HD.

In the first frame, the shutter operation (reset of the PD is cleared) corresponding to the reading of the first vertical scanning operation in the second frame is performed. At time T1ms1, the shutter operation of the first vertical scanning operation is started. In the period from time T1ms1 to time T1ms2, reset of the PD1 is cleared for the pixels P on the first row to the sixth row. Then in the period from time T1ms2 to time T1ms3, reset of the PD2 is cleared for the pixels P on the first row to the sixth row. Thereafter the shutter operation is sequentially performed for the signals of the PD1 and PD2 of each pixel for the 6 rows, synchronizing with the horizontal synchronizing signal HD, for every 2 HDs. Here out of the period of the 2 HDs of the horizontal synchronizing signals, reset of the PD1 of each pixel P is cleared for the 6 rows in the first HD, and reset of the PD2 of each pixel P is cleared for the same 6 rows in the second HD.

In the same manner, an example of executing only the first vertical scanning operation is indicated for the second frame (time T2 to time T3) as well.

Operation Sequence 2

Figure 10:
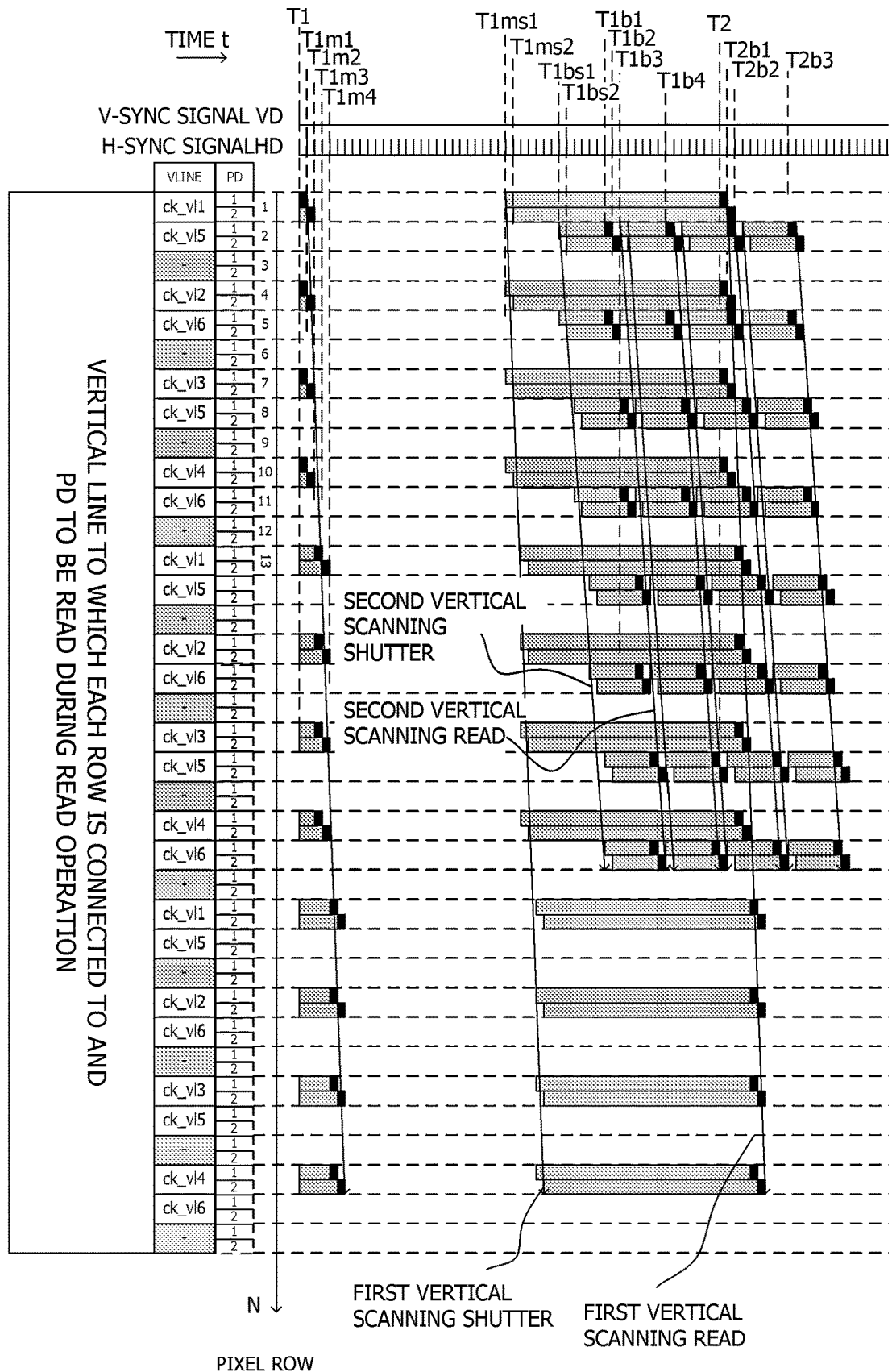
FIG. 10 is an overview of timing chart 2 according to Example 2.

FIG. 10 is a timing chart indicating an example in a second operation mode according to Example 2. In the second operation mode, the vertical scanning unit 103 performs a plurality of vertical scanning operations (read scanning) at one time using the selection transistor M5. In this example, the image data from the second row to the (3L+1)-th row (L: 1 or greater natural number) is acquired in the second vertical scanning operation while acquiring the image data from the first row to the (3N+1)-th row (N: 1 or greater natural number) in the first vertical scanning operation. The images acquired in the first vertical scanning operation are used as the images captured for live view, and the images acquired in the second vertical scanning operation are used as images for flicker detection, for example.

In the case of acquiring image data by read scanning, only the selection transistor M11 of each pixel P is used, and pixel signals are read from the 6 vertical signal lines disposed on each column. Here in the reading by the first vertical scanning operation, 4 lines (cp_vl1, cp_vl2, cp_vl3 and cp_vl4), out of the 6 vertical signal lines disposed on each column, are used. In the reading by the second vertical scanning operation, 2 lines (cp_vl5 and cp_vl6) (p: 1 to m), out of the 6 vertical signal lines disposed on each column, are used.

The first frame (time T1 to time T2) is an example of executing the first vertical scanning operation (once), and the second vertical scanning operation (shutter scanning operation three times, read scanning operation two times).

At time T1, the read operation of the first vertical scanning operation is started. In the period from time T1 to time T1m1, charges of the PD1 of each pixel P on the 4 rows (first row, fourth row, seventh row and tenth row) are read. Here the read operation from the selection transistor M11 of each pixel P is performed by the vertical scanning unit controlling PTX1 ($k$), PTX2 ($k$), PRES (k), PSEL1 ($k$) and PSEL2 ($k$) (k: 1, 4, 7 and 10). The read signal from each pixel is read via sel2 ($k$)_p (k: 1, 4, 7 and 10; p: 1 to m). Specifically, the pixel signals on the first row are read from the vertical signal line cp_vl1, and the pixel signals on the fourth row are read from the vertical signal line cp_vl2. The pixel signals on the seventh row are read from the vertical signal line cp_vl3, and the pixel signals on the tenth row are read from the vertical signal line cp_vl4.

Then in the period from time T1m1 to time T1m2, charges of the PD2 of each pixel P on the 4 rows (first row, fourth row, seventh row and tenth row) are read. Here the read operation from the selection transistor M11 of each pixel P is performed by the vertical scanning unit controlling PTX1 ($k$), PTX2 ($k$), PRES (k), PSEL1 ($k$) and PSEL2 ($k$) (k: 1, 4, 7 and 10). The read signal from each pixel is read via sel2 ($k$)_p (k: 1, 4, 7 and 10; p: 1 to m). Specifically, the pixel signals on the first row are read from the vertical signal line cp_vl1, and the pixel signals on the fourth row are read from the vertical signal line cp_vl2. The pixel signals on the seventh row are read from the vertical signal line cp_vl3, and the pixel signals on the tenth row are read from the vertical signal line cp_vl4.

Then in the period from time T1m2 to time T1m3, charges of the PD1 of each pixel P on the 4 rows (thirteenth row, sixteenth row, nineteenth row and twenty second row) are read. Here the read operation from the selection transistor M11 of each pixel P is performed by vertical scanning unit controlling PTX1 ($k$), PTX2 ($k$), PRES (k), PSEL1 ($k$) and PSEL2 ($k$) (k: 13, 16, 19, 22). The read signal from each pixel is read via sel2 ($k$)_p (k: 13, 16, 19 and 22; p: 1 to m). Specifically, the pixel signals on the thirteenth row are read from the vertical signal line cp_vl1, and the pixel signal on the sixteenth row are read from the vertical signal line cp_vl2. The pixel signals on the nineteenth row are read from the vertical signal line cp_vl3, and the pixel signals on the twenty second row are read from the vertical signal line cp_vl4.

Then in the period from time T1m3 to time T1m4, charges of the PD2 of each pixel P on the 4 rows (thirteenth row, sixteenth row, nineteenth row, twenty second row) are read. Here the read operation from the selection transistor M11 of each pixel P is performed by the vertical scanning unit controlling PTX1 ($k$), PTX2 ($k$), PRES (k), PSEL1 ($k$) and PSEL2 ($k$) (k: 13, 16, 19 and 22). The read signal from each pixel is read via sel2 ($k$)_p (k: 13, 16, 19 and 22; p: 1 to m). Specifically, the pixel signals on the thirteenth row are read from the vertical signal line cp_vl1, and the pixel signals on the sixteenth row are read from the vertical signal line cp_vl2. The pixel signals on the nineteenth row are read from the vertical signal line cp_vl3, and the pixel signals on the twenty second row are read from the vertical signal line cp_vl4.

Thereafter the signals of the PD1 and PD2 of each pixel for the entire 4 rows are sequentially read, synchronizing with the horizontal synchronizing signal HD, for every 2 HDs, with a one row interval every 3 rows. Here out of the period of 2 HDs of the horizontal synchronizing signals, charges of the PD1 of each pixel P are read for 4 rows in the first HD, and charges of the PD2 of each pixel P are read for the same 4 rows in the second HD.

In the first frame, the shutter operation (reset of the PD is cleared) corresponding to the reading of the first vertical scanning operation in the second frame is performed. At time T1ms1, the shutter operation of the first vertical scanning operation is started. In the period from time T1ms1 to time T1ms2, reset of the PD1 is cleared for the pixels P on 4 rows (first row, fourth row, seventh row, tenth row). Then in the period from time T1ms2 to time T1ms3, reset of the PD2 is cleared for the pixels P on the 4 rows (first row, fourth row, seventh row and tenth row). Thereafter the shutter operation is sequentially performed for the signals of the PD1 and PD2 of each pixel P for the 4 rows, synchronizing with the horizontal synchronizing signal HD, for every 2 HDs. Here out of the period of the 2 HDs horizontal synchronizing signals, the reset of the PD1 of each pixel P is cleared for the 4 rows in the first HD, and reset of the PD2 of each pixel P is cleared for the same 4 rows in the second HD.

Then in parallel with the first vertical scanning operation, the shutter operation of the second vertical scanning operation (first time) is performed. At time T1$bs$1, the shutter operation of the second vertical scanning operation is started. In the period from time T1$bs$1 to time T1$bs$2, reset of the PD1 is cleared for the pixels P on 2 rows (second row and fifth row). Then in the period from time T1$bs$2 to time T1$bs$3, reset of the PD2 is cleared for the pixels P on 2 rows (second row and fifth row).

Thereafter the shutter operation is sequentially performed for the signals of the PD1 and PD2 of each pixel for 2 rows, synchronizing with the horizontal synchronizing signal HD, for every 2 HDs. Here out of the period of the 2 HDs of the horizontal synchronizing signals, reset of the PD1 of each pixel P is cleared for 2 rows in the first HD, and reset of the PD2 of each pixel P is cleared for the same 2 rows in the second HD.

Then read operation of the second vertical scanning operation (first time) is performed.

At time T1$b$1, the read operation of the second vertical scanning operation is started. In the period from time T1$b$1 to time T1$b$2, charges of the PD1 of each pixel P on the 2 rows (second row and fifth row) are read. Here the read operation from the selection transistor M11 of each pixel P is performed by the vertical scanning unit controlling PTX1 ($k$), PTX2 ($k$), PRES (k), PSEL1 ($k$) and PSEL2 ($k$) (k: 2 and 5). The read signal from each pixel is read via sel2 ($k$)_p (k: 2 and 5; p: 1 to m). Specifically, the pixel signals on the second row are read from the vertical signal line cp_vl5, and the pixel signals on the fifth row are read from the vertical signal line cp_vl6.

Then in the period from time T1$b$2 to T1$b$3, charges of the PD2 of each pixel P on the 2 rows (second row and fifth row) are read. Here the read operation from the selection transistor M11 of each pixel P is performed by the vertical scanning unit controlling PTX1 ($k$), PTX2 ($k$), PRES (k), PSEL1 ($k$) and PSEL2 ($k$) (k: 2 and 5). The read signal from each pixel is read via sel2 ($k$)_p (k: 2 and 5; p: 1 to m). Specifically, the pixel signals on the second row are read from the vertical signal line cp_vl5, and the pixel signals on the fifth row are read from the vertical signal line cp_vl6.

Thereafter just like the first vertical scanning operation (read operation), the signals of the PD1 and PD2 of each pixel on a total of 2 rows are sequentially read, synchronizing with the horizontal synchronizing signal HD, for every 2 HDs, with a one row interval every 3 rows. Here out of the 2 HD period of the 2 HDs of the horizontal synchronizing signals, charges of the PD1 of each pixel P are read for 2 rows in the first HD, and charges of the PD2 of each pixel P are read for the same 2 rows in the second HD.

Then at time T1$b$4, the read operation of the second vertical scanning operation (second time) is started.

In the same manner, in the second frame (time T2 to time T3), the first vertical scanning operation (once) and the second vertical scanning operation (shutter scanning operation one time, read scanning operation two times) are executed. At time T2, the read operation of the first vertical scanning operation is started. The subsequent read operation is the same as the first frame.

Then in parallel with the read operation of the first vertical scanning operation, the read operation of the second vertical scanning operation (third time, including the first frame) starts at time T2$b$1. The subsequent read operation is the same as the first frame.

Then the shutter operation of the second vertical scanning operation (fourth time, including the first frame) starts at time T2$b$1. The subsequent shutter operation is the same as the first frame.

Further, the read operation of the second vertical scanning operation (fourth time, including the first frame) starts at time T2$b$1. The subsequent read operation is the same as the first frame.

Advantageous Effects of Example 2

According to Example 2, similar effects to Example 1 can be implemented even in a solid-state imaging apparatus in which one pixel includes 2 PDs.

Example 3

In Example 3, 10 vertical signal lines are disposed in each column. In Example 3, in the case of the scanning mode in which 2 read scanning operations (first vertical scanning operation and second vertical scanning operation) are performed concurrently, 8 vertical signal lines are assigned for the first vertical scanning operation, and the two vertical signal lines are assigned for the second vertical scanning operation.

A difference from Example 1 is that a number of selection transistors disposed to connect each pixel and the vertical signal line is 3. In a case of performing a single vertical scanning operation (first vertical scanning operation), the pixels are driven using 2 out of the 3 selection transistors. In a case of the scanning mode in which 2 read scanning operations (first vertical scanning operation and second vertical scanning operation) are performed concurrently, the pixels are driven using the remaining selection transistor, that is, a selection transistor other than the above mentioned selection transistors.

The general configuration of the solid-state imaging apparatus 1 is the same as Example 1 (FIG. 1)

Pixel P

Figure 11:
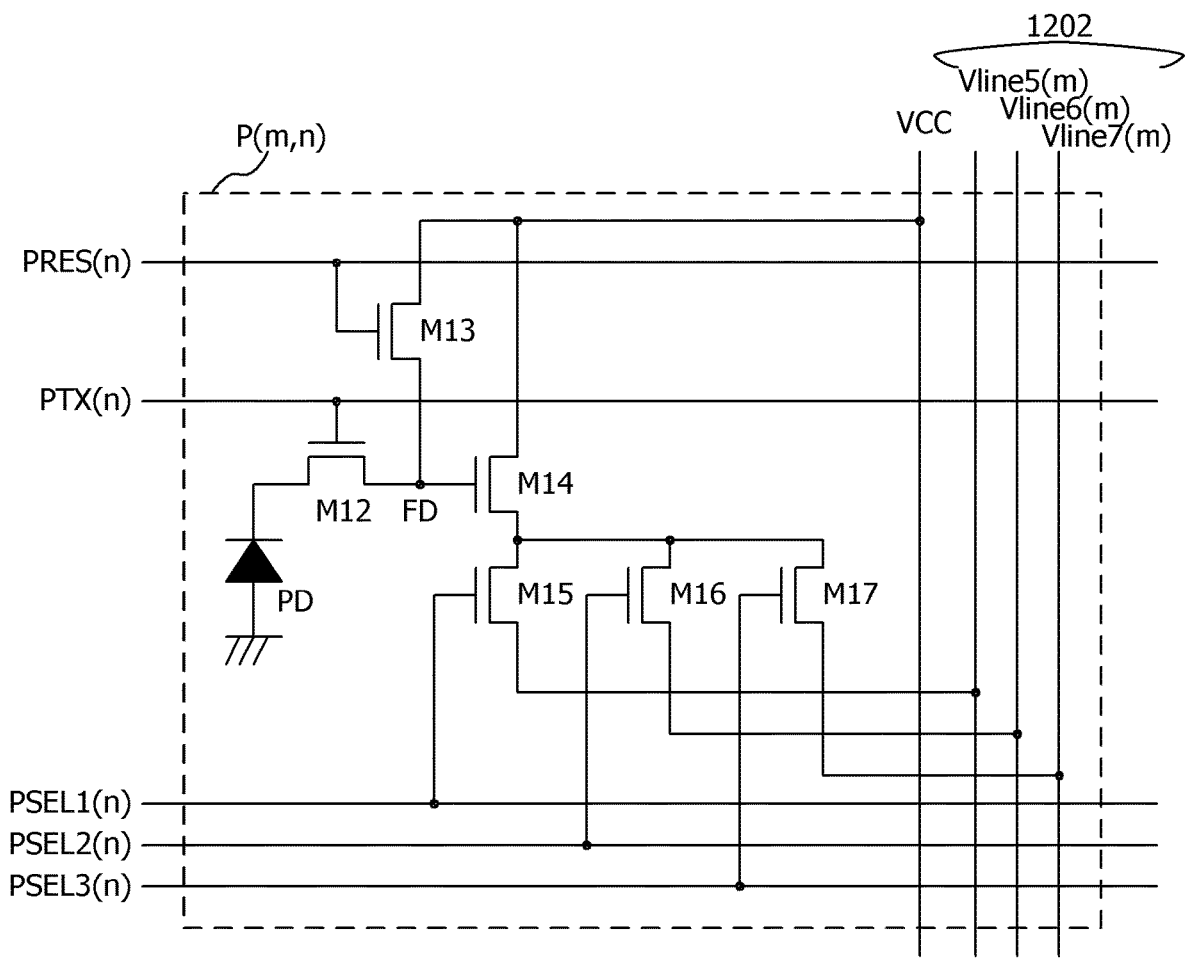
FIG. 11 is an equivalent circuit diagram of a pixel according to Example 3.

FIG. 11 is a diagram depicting a configuration example of a pixel P included in the pixel unit 104. A main difference from Example 1 is that not 2 selection transistors but 3 selection transistors are disposed in one pixel.

In FIG. 11, the pixel P (m, n) indicates a pixel that is disposed at the n-th row and m-th column of the pixel unit 104.

The pixel P includes a PD, an FD, a transfer transistor M12, a reset transistor M13, an amplification transistor M14, a selection transistor M15, a selection transistor M16 and a selection transistor M17.

The PD is a photoelectric conversion element that performs photoelectric conversion, generates charges in accordance with the incident light, and stores the generated charges. The transfer transistor M12 transfers the charges from the PD to the FD, which is an input node of the amplification transistor M14. The FD holds the charges transferred via the transfer transistor M12. The reset transistor M13 resets the voltage of the FD to a predetermined voltage. The amplification transistor M14 outputs a signal, based on the potential of the FD which fluctuates in accordance with the transferred charges. The signal is outputted from the vertical signal lines Vline5 ($m$), Vline6 ($m$) or Vline7 ($m$) respectively on the m-th column via one of the selection transistor M15, the selection transistor M16 and the selection transistor M17 respectively.

A drain of the reset transistor M13 and a drain of the amplification transistor M14 are electrically connected to a pixel power supply VCC. A source of the amplification transistor M14 is electrically connected to a current source (not illustrated) via the selection transistors M15, M16 and M17, and the vertical signal lines Vline5 (*m*), Vline6 (*m*) and Vline7 (*m*), and operates as a source-follower circuit. In other words, the amplification transistor M14 can output a signal in accordance with the potential of the FD connected to the gate terminal.

Each transistor is constituted of an N-channel transistor, but may be constituted of a P-channel transistor.

Operation of Pixel P

A signal PSEL1 (*n*) is a signal to control the selection transistor M15 on the n-th row, and is inputted to the gate of the selection transistor. A signal PSEL2 (*n*) is a signal to control the selection transistor M16 on the n-th row, and is inputted to the gate of the selection transistor. A signal PSEL3 (*n*) is a signal to control the selection transistor M17 on the n-th row, and is inputted to the gate of the selection transistor.

Unlike Example 1, the 3 signals PSEL1 (*n*), PSEL2 (*n*) and PSEL3 (*n*) are controlled in Example 3, thereby connecting to the 3 vertical signal lines becomes possible. The other operations are the same as Example 1.

Vertical Scanning Circuit

Figure 12:
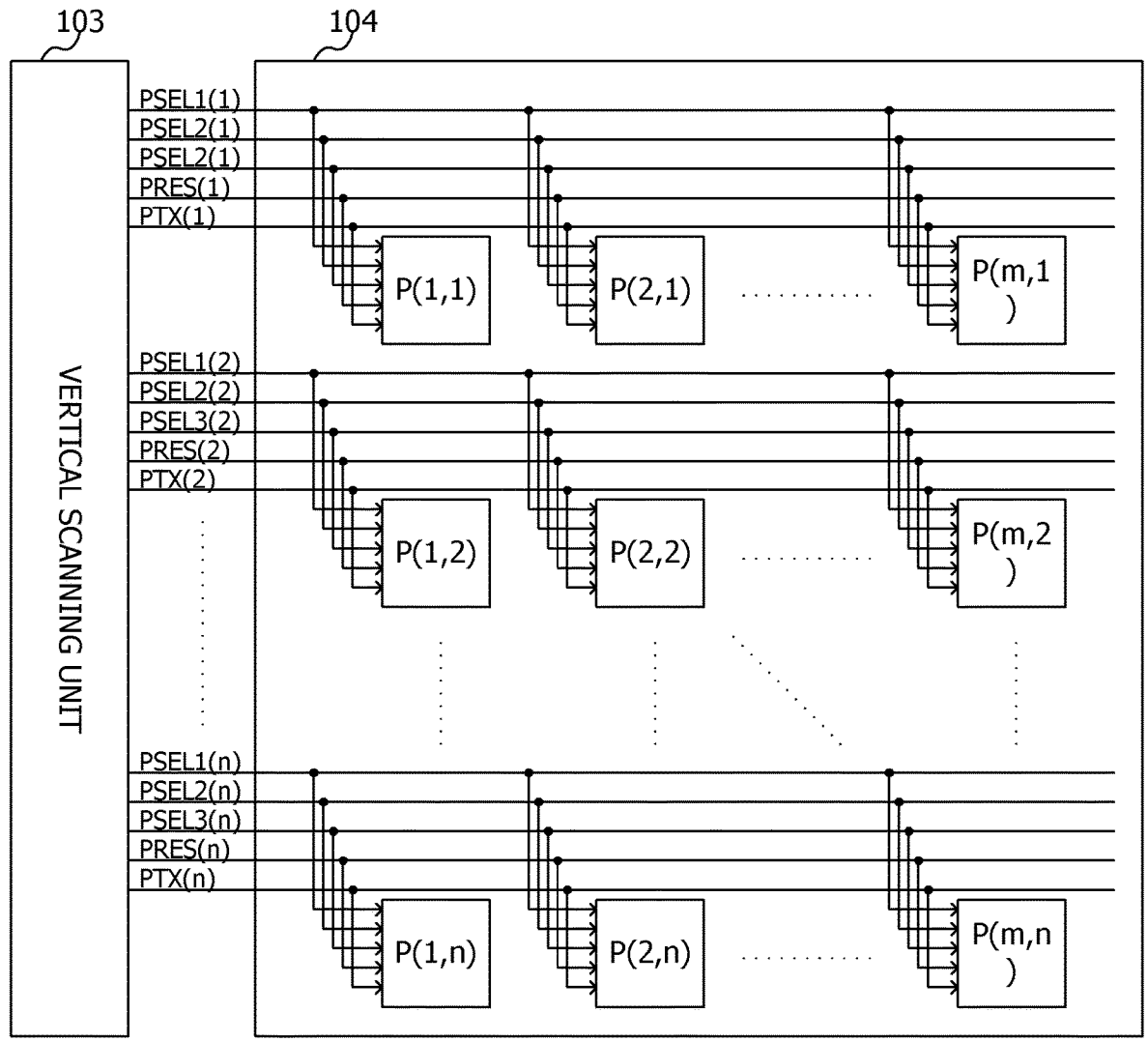
FIG. 12 is a schematic diagram depicting a configuration of the vertical scanning unit 103 and the pixel unit 104 according to Example 3.

FIG. 12 is a schematic diagram depicting a configuration example of the vertical scanning unit 103 and the pixel unit 104 according to Example 3. The difference from Example 1 is that not only the signals PSEL1 (*k*) and PSEL2 (*k*), but also PSEL3 (*k*) (k: 1 to n) is used as a signal connected to the selection transistor of each pixel.

The vertical scanning unit 103 outputs signals PTX (k), PRES (k), PSEL1 (*k*), PSEL2 (*k*) and PSEL3 (*k*) (k: 1 to n). The signals PTX (k), PRES (k), PSEL1 (*k*), PSEL2 (*k*) and PSEL3 (*k*) outputted from the vertical scanning unit 103 are connected to each pixel P (m, k) (k: 1 to n) disposed on the k-th row. By controlling the signals PTX (k), PRES (k), PSEL1 (*k*), PSEL2 (*k*) and PSEL3 (*k*), the vertical scanning unit 103 can cause the pixels on the k-th row to perform the shutter operation and the read operation.

Column Configuration

Figure 13A:
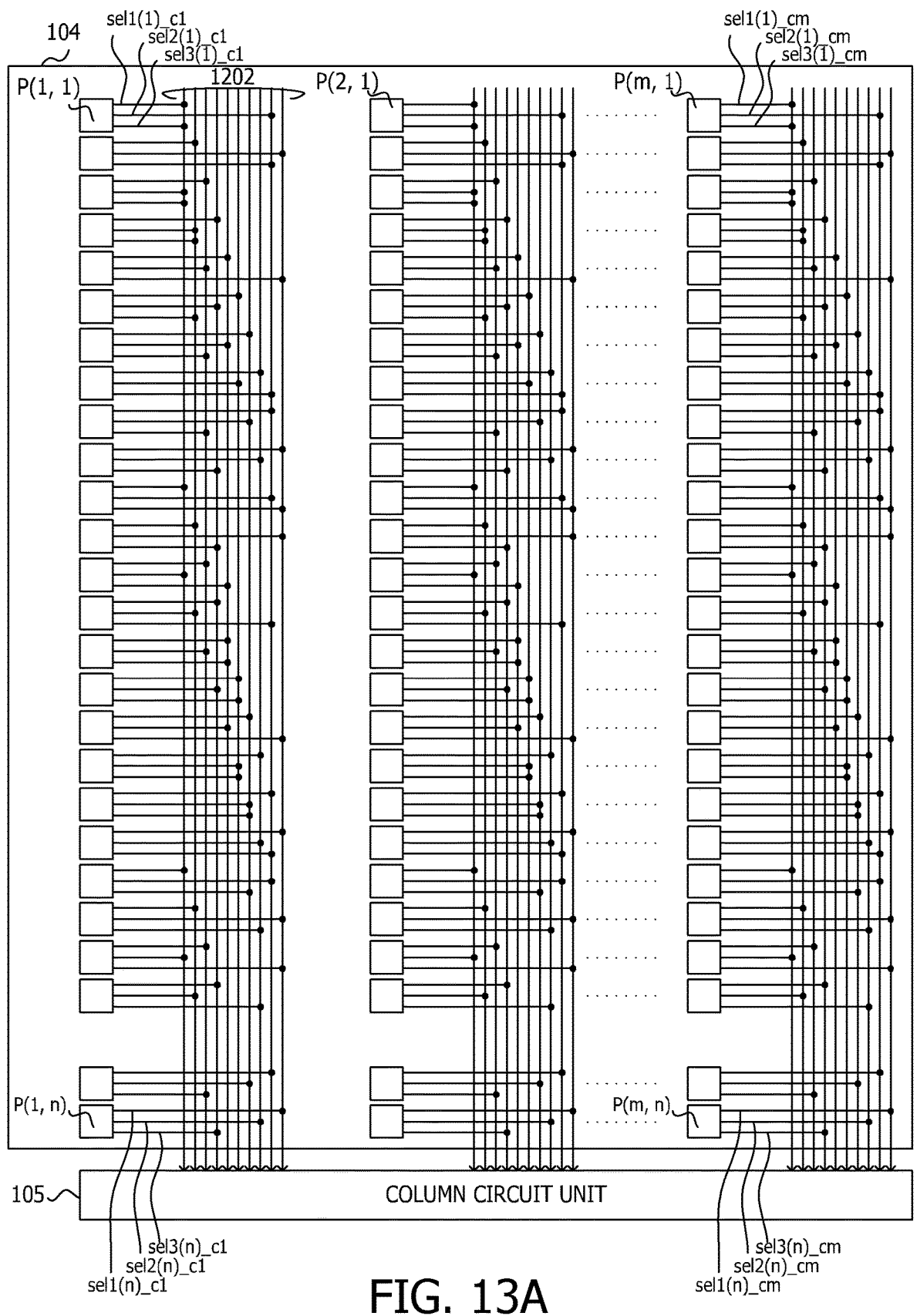
FIG. 13A is a schematic diagram depicting a configuration of the pixel unit 104 and peripheral circuits according to Example 3.

FIG. 13A is a schematic diagram depicting a configuration example of the pixel unit 104 and the column circuit unit 105 according to Example 3. Differences from Example 1 are that a number of vertical signal lines disposed on each column is not 6 but 10, and that the 10 vertical signal lines on each column and pixels on each row are connected not by 2 selection transistors but by 3 selection transistors.

The pixel unit 104 has pixels P (m, n) on each column. The pixel unit 104 also has vertical signal lines 1202 which are connected to the pixels on each column.

The selection transistor M15 disposed in the pixel P (m, n) on the m-th column and the n-th row and the vertical signal line 1202 are connected by the signal line sel1 (n)_cm. The selection transistor M16 disposed in the pixel P (m, n) and the vertical signal line 1202 are connected by the signal line sel2 (*n*)_cm. Further, the selection transistor M17 disposed in the pixel P (m, n) and the vertical signal line 1202 are connected by the signal line sel3 (*n*)_cm.

The vertical signal lines 1202 are connected to a constant current source (not illustrated). The vertical signal lines 1202 are also connected to the column circuit unit 105.

In Example 3, 10 vertical signal lines 1202 are disposed for each column. Further, in Example 3, the 10 vertical signal lines connected to the pixels on the first column are denoted by c1_vl #(#: 1 to 10), and the 10 vertical signal lines connected to the pixels on the m-th column are denoted by cm_vl #.

FIG. 13B is a table for briefly explaining the connection relationship between the selection transistors (output signal lines) of each pixel and the vertical signal lines.

Connection between Selection Transistor M15 of Pixel P and Vertical Signal Line

The signal line sel1 (*n*)_cm on each row and the vertical signal line cm_vl #(#: 1 to 10) are connected as follows.

The signal line sel1 (1)_ck of the pixel P (k, 1) on the first row is connected with the vertical signal line ck_vl1 (k: 1 to m).

The signal line sel1 (2)_ck of the pixel P (k, 2) on the second row is connected with the vertical signal line ck_vl2 (k: 1 to m).

The signal line sel1 (3)_ck of the pixel P (k, 3) on the third row is connected with the vertical signal line ck_vl3 (k: 1 to m).

The signal line sel1 (4)_ck of the pixel P (k, 4) on the fourth row is connected with the vertical signal line ck_vl4 (k: 1 to m).

In this way, the output signal line on each row is sequentially connected with each of the 10 vertical signal lines, and this connection is repeated in a 10-row cycle.

Connection with the vertical signal lines ck_vl #(#: 1 to 10) need not be in a row sequence all the time, as long as each of ck_vl #is connected once to the selection transistor M15 of the pixel P every continuous 10 rows. In other words, required here is that each of the vertical signal lines is connected once to the selection transistor M15 of the pixel P every 10 rows.

Connection Between Selection Transistor M16 of Pixel P and Vertical Signal Line

The signal line sel2 (*n*)_cm on each row and the vertical signal line cm_vl #(#: 1 to 10) are sequentially connected with ck_vl1 to ck_vl10 from the third row for each row. Specifically, this connection is as follows.

The signal line sel2 (3)_ck of the pixel P (k, 3) on the third row is connected with the vertical signal line ck_vl1 (k: 1 to m).

The signal line sel2 (4)_ck of the pixel P (k, 4) on the fourth row is connected with the vertical signal line ck_vl2 (k: 1 to m).

The signal line sel2 (5)_ck of the pixel P (k, 5) on the fifth row is connected with the vertical signal line ck_vl3 (k: 1 to m).

The signal line sel2 (6)_ck of the pixel P (k, 6) on the sixth row is connected with the vertical signal line ck_vl4 (k: 1 to m).

In this way, the signal line on each row is sequentially connected with each of the 10 vertical signal lines, and this connection is repeated in a 10-row cycle.

Connection with the vertical signal lines ck_vl #(#: 1 to 10) need not be in a row sequence all the time, as long as each of ck_vl #is connected once to the selection transistor M16 of the pixel P every continuous 10 rows. In other words, required here is that each of the vertical signal lines is connected once to the selection transistor M16 of the pixel P every 10 rows.

Connection between Selection Transistor M17 of Pixel P and Vertical Signal Line

Connection between the signal line sel3 (*n*)_cm on each row and the vertical signal line cm_vl #(#: 1 to 10) will be described separately for the case of the vertical signal lines cm_vl #(#: 1 to 8) and the case of the vertical signal lines cm_vl #(#: 9 and 10).

The vertical signal lines cm_vl #(#: 1 to 8) are connected as follows.

The signal line sel3 (1)_ck of the pixel P (k, 1) on the first row is connected with the vertical signal line ck_vl1 (k: 1 to m).

The signal line sel3 (4)_ck of the pixel P (k, 4) on the fourth row is connected with the vertical signal line ck_vl2 (k: 1 to m).

The signal line sel3 (7)_ck of the pixel P (k, 7) on the seventh row is connected with the vertical signal line ck_vl3 (k: 1 to m).

In this way, the vertical signal lines cm_vl #(#: 1 to 8) are sequentially connected with the selection transistor M17 of each pixel P every 3 rows. This connection at one cycle constituted of 24 rows is periodically repeated.

In Example 3, the connection is performed every 3 rows, but the connection need not be every 3 rows all the time, and may be every S rows (S is 2 or greater integer) when needed. The above description of Example 3 is a case of S=3. Further, the vertical signal lines cm_vl #(#: 1 to 8) are sequentially connected every 3 rows, but connection need not be in this sequence all the time, as long as each of the vertical signal lines cm_vl #(#: 1 to 8) is connected once to the selection transistor M17 of the pixel P respectively within S×8 rows. In other words, required here is that each of the vertical signal lines cm_vl #(#: 1 to 8) is connected once to the selection transistor M17 of the pixel P every S×8 rows.

The vertical signal line cm_vl #(#: 9 and 10) are connected as follows.

The signal line sel3 (2)_ck of the pixel P (k, 2) on the second row is connected with the vertical signal line ck_vl5 (k: 1 to m).

The signal line sel3 (5)_ck of the pixel P (k, 5) on the fifth row is connected with the vertical signal line ck_vl6 (k: 1 to m).

In this way, the vertical signal lines cm_vl9 and cm_vl10 are sequentially (alternately) connected to the selection transistor M17 of the pixel P every 3 rows. This connection at one cycle constituted of 6 rows is periodically repeated.

In Example 3, the connection is performed every 3 rows, but the connection need not be every 3 rows all the time, and may be every S rows (S is 2 or greater integer) when needed. The above description of Example 3 is a case of S=3. Further, the vertical signal lines cm_vl #(#: 9 and 10) are sequentially connected to the selection transistor M17 of the pixel P every 3 rows but the connection need not be in this sequence all the time, as long as each of the vertical signal lines cm_vl #(#: 9 and 10) is connected once to the selection transistor M17 of the pixel P respectively within S×2 rows. In other words, required here is that each of the vertical signal lines cm_vl #(#: 9 and 10) is connected once to the selection transistor M17 of the pixel P every S×2 (=S×(10−8)) rows.

For the connection of each pixel on a row not described above ((3n+3)-th (n is 0 or greater integer) row) and a vertical signal line, any vertical signal line may be connected.

For example, ck_vl9 may be connected with the (6n+3)-th row, and ck_vl10 may be connected with the (6n+6)-th row. FIG. 13A indicates this connection method. If this connection method is used, a number of selection transistors M15, M16 and M17 of the pixel connected to each of the 10 vertical signal lines disposed on each column becomes similar, therefore the transistor capacity connected to each vertical signal line can be equalized even more.

Further, if this connection method is used, the pixel signals on the (6n+2)-th row and the (6n+3)-th row can be analog-added and read on the vertical signal line ck_vl9, and the pixel signals on the (6n+5)-th row and the (6n+6)-th row can be analog-added and read on the vertical signal line ck_vl10.

As another example, the pixel of the (3n+3)-th row and the vertical signal line may be connected as follows.

(24n+3)-th row: ck_vl1 is connected
(24n+6)-th row: ck_vl2 is connected
(24n+9)-th row: ck_vl3 is connected
(24n+12)-th row: ck_vl4 is connected
(24n+15)-th row: ck_vl5 is connected
(24n+18)-th row: ck_vl6 is connected
(24n+21)-th row: ck_vl7 is connected
(24n+24)-th row: ck_vl8 is connected If this connection method is used, the pixel signals can be analog-added on the vertical signal lines ck_vl1 to ck_vl8. In this case, the pixel signals on the (24n+1)-th row and the pixel signals on the (24n+3)-th row can be analog-added on the vertical signal line ck_vl1. In the same manner, 2 pixel signals can be analog-added on the vertical signal lines for the other rows.

Operation Sequence 1

An example of the vertical scanning operation in a first operation mode according to Example 3 will be described. In the first operation mode, the vertical scanning unit 103 performs only a single vertical scanning operation (first vertical scanning operation) at one timing using the selection transistors M15 and M16. Here the "read operation" of the first vertical scanning operation will be described, but the "shutter operation" can also be performed based on the same concept as the "read operation".

In the case of performing a single vertical scanning operation (first vertical scanning only), either one or both of the selection transistors M15 and M16, out of the 3 selection transistors M15 to M17 disposed in a pixel are used to perform the scanning operation. In Example 3, a first sub-mode in which only the selection transistor M15 is used, and a second sub-mode in which the selection transistors M15 and M16 are used, are available.

The first sub-mode of the first operation mode will be described. A case of performing the read scanning operation 10 rows at a time synchronizing with the horizontal synchronizing signal HD in this mode will be described with reference to FIG. 14. In this case, for each HD, the vertical scanning unit 103 reads pixel signals for a continuous 10 rows using the selection transistor M15 of each pixel. In other words, the vertical scanning unit 103 controls the continuous 10 rows of PTX (k), PRES (k), PSEL1 (k) and PSEL2 (k). Thereby signals of the pixels P on the continuous 10 rows can be read all at once for every HD using the vertical signal lines ck_vl1 to 10. Thereafter the read scanning operation can be sequentially performed for 10 rows at a time, synchronizing with the horizontal synchronizing signal HD.

The second sub-mode of the first operation mode will be described. In this mode, the pixel signals on 2 rows are analog-added at every 3 rows on the vertical signal line, synchronizing with the horizontal synchronizing signal HD, for example, and the read scanning operation is performed sequentially or these pixel signals for a total of 20 rows at a time. This example will be described with reference to FIG. 15. In this case, for each HD, the vertical scanning unit 103 reads 10 rows of pixel signals at every 3 rows using the selection transistor M15 of each pixel. Further, for the same HD, the vertical scanning unit 103 reads 10 rows of pixel signals at every 3 rows using the selection transistor M16 of each pixel, from a position that is shifted by 2 rows from the start pixel row to be read using the selection transistor M15.

By this method, for each HD, the signals of pixels P on the continuous 20 rows can be read all at once using the vertical signal lines ck_vl1 to 10, while being analog-added on the vertical signal lines at every 2 rows.

Operation Sequence 2

An operation in a case where a plurality of scanning operations (first vertical scanning operation and second vertical scanning operation) are performed concurrently will be described. Here the "read operation" of the first vertical scanning operation and the second vertical scanning operation will be described, but the "shutter operation" can also be performed based on the same concept as the "read operation".

The difference from Example 1 is that out of 10 vertical signal lines on each column that are used for the read scanning operation, the read operation is performed using the 8 vertical signal lines ck_vl1 to ck_vl8 for the first vertical scanning operation, and the read operation is performed using the 2 vertical signal lines ck_vl9 and ck_vl10 for the second vertical scanning operation. In Example 1, the ratio of the vertical signal lines used for the first vertical scanning operation and the vertical signal lines used for the second vertical scanning operation is 2:1, but in Example 3, this ratio is 4:1.

The scanning operation in this example will be described with reference to FIG. 16. In the case of reading by the first vertical scanning operation, 8 lines (cp_vl1 to 8), out of the 10 vertical signal lines disposed on each column, are used. In the case of reading by the second vertical scanning operation, 2 lines (cp_vl9 and cp_vl10) (p: 1 to m), out of the 6 vertical signal lines disposed on each column, are used. Here in the reading by the first vertical scanning operation, the read scanning operation is performed sequentially for a total of 8 rows at a time with a one row interval every 3 rows, synchronizing with the horizontal synchronizing signal HD, and in the reading by the second vertical scanning operation, the read scanning operation is performed sequentially for a total of 2 rows at a time with a one row interval every 3 rows.

In Example 3, a number of the vertical signal lines is 10, but even if a number of vertical signal lines increases, the mode in which only reading by the first vertical scanning operation is performed and the mode in which both the reading by the first vertical scanning operation and the reading by the second vertical scanning operation are performed concurrently, can be implemented based on the same concept. In the mode in which only the reading by the first vertical scanning operation is performed, the reading operation is performed via a part (one or more) of the plurality of selection transistors disposed in each pixel. In the mode in which the first vertical scanning operation and the second vertical scanning operation are concurrently performed, the reading operation is performed via selection transistors that are not used for performing the single reading operation.

Further, in the case of performing the first vertical scanning operation and the second vertical scanning operation concurrently, the ratio of the number of vertical signal lines used for the first vertical scanning operation and that used for the second vertical scanning operation may be changed depending on the application.

Advantageous Effect of Example 3

According to the above configuration, various read methods can be implemented without imposing major restrictions on hardware, while implementing both the mode in which only the reading by the first vertical scanning operation is performed and the mode in which the reading by the first vertical scanning operation and the read of the second vertical scanning operation are concurrently performed. Even if a number of vertical signal lines to be used increases, the vertical read scanning operation can be performed using all the vertical signal lines.

Example 4

The configuration of the solid-state imaging apparatus 1 will be described in more general terms. Example 4 includes the above mentioned Examples 1 to 3.

The solid-state imaging apparatus includes a plurality of pixels, vertical signal lines, selection circuits, a vertical scanning circuit and a control unit. The pixels are disposed two-dimensionally in the row direction and the column direction. L number of (L is 3 or greater integer) vertical signal lines are disposed on each pixel column. M number of (M is 2 or greater integer) selection circuits are disposed in each pixel, and each selection circuit connects the output signal line of the pixel to a different vertical signal line. The vertical scanning circuit scans the selection circuits.

Here the control unit can set a first operation mode in which the vertical scanning circuit performs a single read scanning operation at one timing, and a second operation mode in which the vertical scanning circuit performs a plurality of read scanning operations at one timing. In the first operation mode, the read scanning operation is performed using a first selection circuit out of M number of selection circuits, and in the second operation mode, the read scanning operation is performed using a second selection circuit other than a first selection circuit, out of the M number of selection circuits.

In Examples 1 and 2, a number of vertical signal lines is 6 (L=6), and each pixel includes 2 selection circuits of the selection transistors M4 and M5, or M10 and M11 (M=2). In Example 1, in the first operation mode, a single read scanning operation is performed using only the selection transistor M4, and in the second operation mode, a plurality of read scanning operations are concurrently performed using only the selection transistor M5. In Example 2, in the first operation mode, a single read scanning operation is performed using only the selection transistor M10, and in the second operation mode, a plurality of read scanning operations are concurrently performed using only the selection transistor M11.

In Example 3, a number of vertical signal lines is 10 (L=10), and each pixel includes 3 selection circuits of the selection transistors M15 to M17 (M=3). In the first operation mode, a single read scanning operation is performed using only the selection transistor M15 or using the selection transistors M15 and M16, and in the second operation mode, a plurality of read scanning operations are concurrently performed using only the selection transistor M17.

In all of Examples 1 to 3, the read scanning operation is performed using only one selection transistor in the second operation mode, but this is not essential. For example, even in the second operation mode, the read scanning operation involving the analog-addition on the vertical signal line may be performed using a plurality of selection transistors, just like the second sub-mode of the first operation mode of Example 3. In this case as well, a number of selection transistors disposed in one pixel is 3 or more.

Further, in Example 4, each of the L number of vertical signal lines is connected to at least one selection circuit at every L rows. Furthermore, P number of (P is an integer that is at least 1 and not greater than L−1) vertical signal lines, out of the L number of vertical signal lines, are connected to at least one selection circuit in every S×P (S is 2 or greater integer) rows. The L−P number, out of the L number of vertical signal lines (other than the P number of vertical signal lines) are connected to at least one selection circuit in every S×(L−P) rows.

Examples 1 and 2 are examples where L=6, P=4 and S=3. The selection transistor M4 or M10 is connected at least once to each of the 6 vertical signal lines ck_vl1 to ck_vl6 respectively every 6 rows (once every 6 rows). Further, the selection transistor M5 or M11 is connected at least once to each of the 4 vertical signal lines ck_vl1 to ck_vl4 respectively every 12 (=4×3) rows (once every 12 rows). Furthermore, the selection transistor M5 or M11 is connected at least once to each of the 2 vertical signal lines ck_vl5 and ck_vl6 respectively every 6 (=(6−4)×3) rows (once every 6 rows). In the case of connecting the pixels on the (3n+3)-th row with any of the vertical signal lines, the connection frequency is higher than the above description.

Example 3 is an example where L=10, P=8 and S=3. The selection transistor M15 is connected once to each of the 10 vertical signal lines ck_vl1 to ck_vl10 respectively every 10 rows (once every 10 rows). Further, the selection transistor M17 is connected at least once to each of the 8 vertical signal lines ck_vl1 to ck_vl8 respectively every 24 (=8×3) rows (once every 24 rows). Furthermore, the selection transistor M17 is connected at least once to each of the 2 vertical signal lines ck_vl9 and ck_vl10 respectively every 6 (=(10−8)×3) rows (once every 6 rows). In the case of connecting the pixel on the (3n+3)-th row with any of the vertical signal lines, the connection frequency is higher than the above description.

An expert skilled in the art will easily understand that the values of L, P and S are not limited to the values indicated in Examples 1 to 3, which can be appropriately changed.

Example 5

An photoelectric conversion system according to a example 5 of the present disclosure will be explained with reference to FIG. 17. FIG. 17is a block diagram of a schematic configuration of an imaging system according to this example.

The photoelectric conversion devices (CMOS image sensor) described in the above examples 1 to 4 may apply to various imaging systems. Applicable photoelectric conversion systems may include, but are not limited to, various types of equipment such as a digital still camera, a digital camcorder, a monitor camera, a copying machine, a facsimile, a mobile phone, an in-vehicle camera, an observation satellite, a medical camera, or the like. The imaging systems may also include a camera module including an optical system such as a lens and a photoelectric conversion device (CMOS image sensor). FIG. 17 is a block diagram of a digital still camera as an example of those photoelectric conversion systems.

Figure 17:
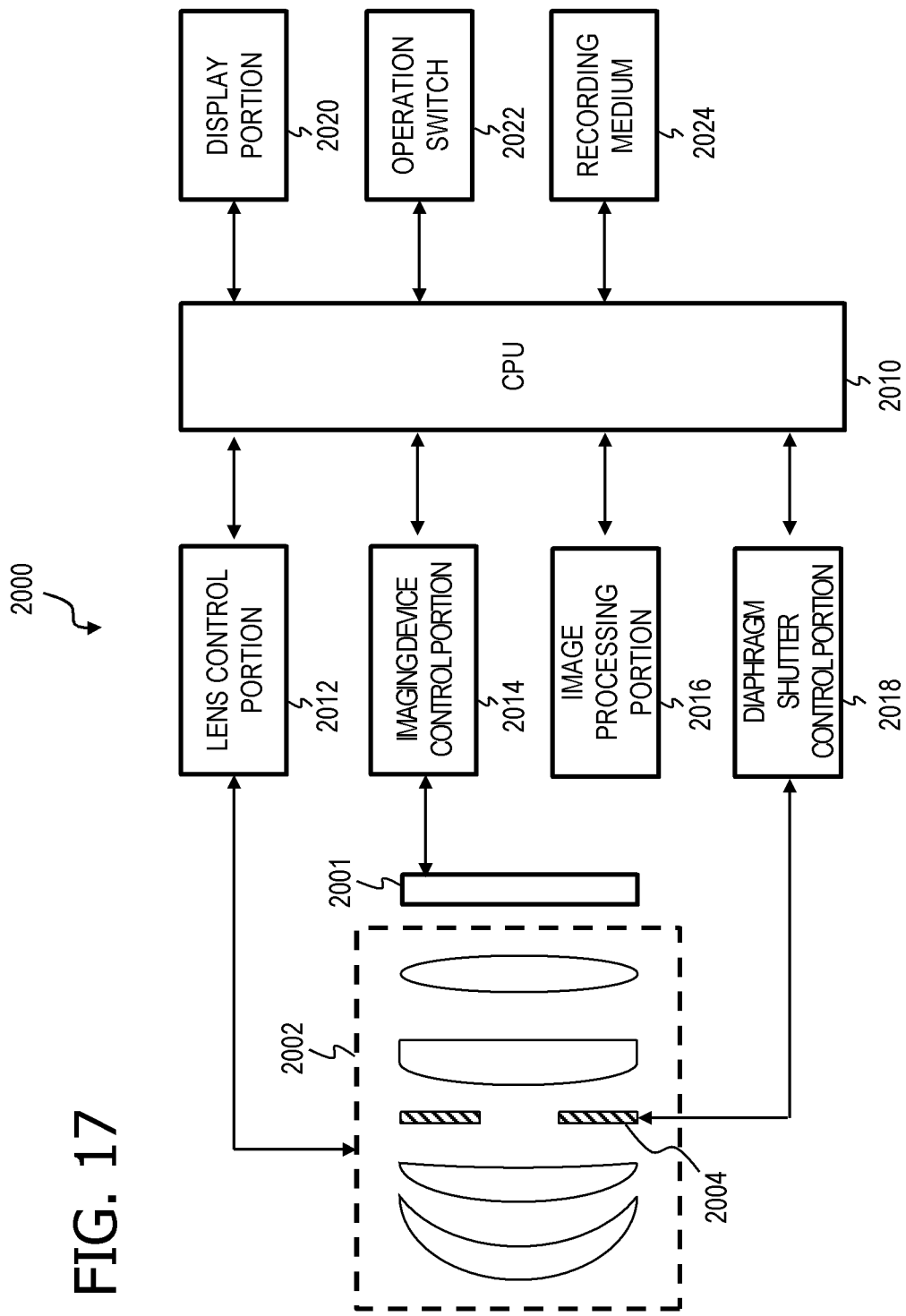
FIG. 17 is a schematic diagram depicting a configuration of a photoelectric conversion system according to Example 4.

FIG. 17 shows a photoelectric conversion system 2000, which includes an imaging device 2001, an imaging optical system 2002, a CPU 2010, a lens control portion 2012, an imaging device control portion 2014, an image processing portion 2016, and a diaphragm shutter control portion 2017. The photoelectric conversion system 2000 also includes a display portion 2020, an operation switch 2022, and a recording medium 2024.

The imaging optical system 2002 is an optical system for forming an optical image of the subject, and includes a lens group, a diaphragm 2004, or the like. The diaphragm 2004 has a function of adjusting light intensity during photography by adjusting its opening size. The diaphragm 2004 also functions as an exposure time adjustment shutter during still image photography. The lens group and the diaphragm 2004 are held movable forward and backward in the optical axis direction. These linked operations may provide a scaling function (zoom function) and a focus adjustment function. The imaging optical system 2002 may be integrated into the photoelectric conversion system or may be an imaging lens mountable to the photoelectric conversion system.

The imaging device 2001 is disposed such that its imaging plane is positioned in the image space of the imaging optical system 2002. The imaging device 2001 is one of the solid-state imaging devices (photoelectric conversion devices) explained in the examples 1 to 4. The imaging device 2001 includes a CMOS sensor (pixel portion) and its peripheral circuits (peripheral circuit area). The imaging device 2001 includes a plurality of pixels arranged in two dimensions, each pixel including a photoelectric conversion portion. These pixels are provided with color filters to form a two-dimensional single-plate color sensor. The imaging device 2001 may photoelectrically convert a subject image imaged by the imaging optical system 2002 for output as an image signal and/or a focus detection signal.

The lens control portion 2012 is to control the forward and backward driving of the lens group in the imaging optical system 2002 to perform scaling operation and focus adjustment. The lens control portion 2012 includes a circuit and/or processing unit configured to achieve those functions. The diaphragm shutter control portion 2018 is to change the opening size of the diaphragm 2004 (for a variable diaphragm value) to adjust light intensity during photography, and is constituted of a circuit and/or processing unit configured to achieve those functions.

The CPU 2010 is a control unit in a camera responsible for various controls of the camera bod, and includes an operation portion, a ROM, a RAM, an A/D converter, a D/A converter, a communication interface circuit, or the like. The CPU 2010 controls the operation of each portion in the camera according to a computer program stored in a ROM or the like. The CPU 2010 performs a series of photography operations such as AF, imaging, image processing, and recording, including detection of the focus state (focus detection) of the imaging optical system 2002. The CPU 2010 also serves as a signal processing portion.

The imaging device control portion 2014 is to control the operation of the imaging device 2001 and to A/D convert a signal output from the imaging device 2001 and transmit the result to the CPU 2010, and includes a circuit and/or control unit configured to achieve those functions. The imaging device 2001 may have the A/D conversion function. The image processing portion 2016 is a processing unit that subjects the A/D converted signal to processing such as y conversion and color interpolation to generate an image signal. The image processing portion 2016 includes a circuit and/or control unit configured to achieve those functions. The display portion 2020 is a display device such as a liquid crystal display device (LCD), and displays information related to a photography mode of the camera, a preview image before photography, a check image after photography, the focused state at the focus detection, or the like. The operation switch 2022 includes a power supply switch, a release (photography trigger) switch, a zoom operation switch, a photography mode selection switch, or the like. The recording medium 2024 is to record a photographed image or the like, and may be built in the photoelectric conversion system or removable such as a memory card.

In this way, the photoelectric conversion system 2000 applied with the imaging device 2001 according to examples 1 to 4 may provide a high performance photoelectric conversion system.

Example 6

Figure 18A:
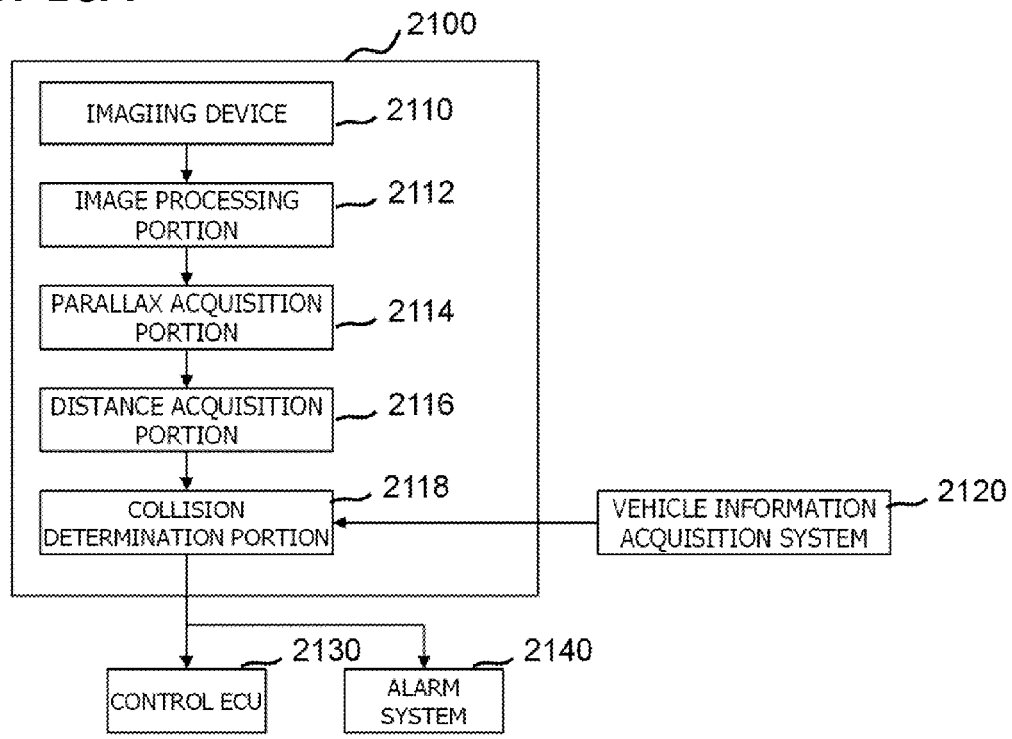
FIG. 18A and FIG. 18B are schematic diagrams depicting a configuration of a mobile system according to Example 5.
Figure 18B:
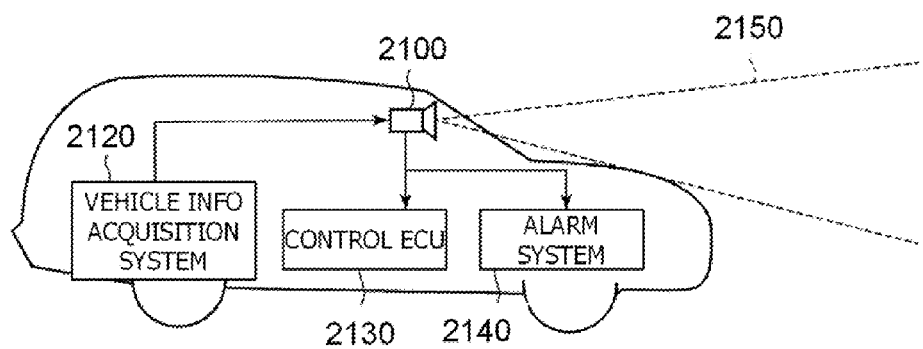

A photoelectric conversion system and a mobile object according to example 6 of the present disclosure will be explained with reference to FIGS. 18A and 18B. FIGS. 18A and 18B show configurations of the imaging system and mobile object according to this embodiment.

FIG. 18A shows an example of a photoelectric conversion system 2100 associated with an in-vehicle camera. The photoelectric conversion system 2100 has an imaging device 2110. The imaging device 2110 is any one of the photoelectric conversion apparatus (solid-state imaging devices) according to the above examples 1 to 4. The photoelectric conversion system 2100 has an image processing portion 2112 and a parallax acquisition portion 2114. The image processing portion 2112 is a processing unit that subjects a plurality of sets of image data acquired by the imaging device 2110 to image processing. The parallax acquisition portion 2114 is a processing unit that calculates parallax (a phase difference of a parallax image) from the sets of image data acquired by the imaging device 2110. The photoelectric conversion system 2100 also includes a distance acquisition portion 2116, which is a processing unit that calculates the distance to the subject based on the calculated parallax. The imaging system 2100 also includes a collision determination portion 2118, which is a processing unit that determines a possibility of collision based on the calculated distance. Here, the parallax acquisition portion 2114 and the distance acquisition portion 2116 are examples of information acquiring means that acquires information such as distance information to the subject. In other words, the distance information is information related to parallax, defocus amount, the distance to the subject, or the like. The collision determination portion 2118 may determine a possibility of collision using any of the distance information. The above processing unit may be provided by specially designed hardware or may be provided by general hardware that performs operation based on a software module. In addition, the processing unit may be provided by a Field Programmable Gate Array (FPGA), an Application Specific Integrated Circuit (ASIC), or the like or may be provided by a combination thereof.

The photoelectric conversion system 2100 is connected to a vehicle information acquisition system 2120, and may thus acquire vehicle information including a vehicle speed, a yaw rate, and a rudder angle. The photoelectric conversion system 2100 also has a control ECU 2130 connected thereto. The ECU 2130 is a control unit that outputs a control signal for generating a braking force to the vehicle based on the determination by the collision determination portion 2118. In other words, the control ECU 2130 is an example of a mobile object control means that controls a mobile object based on the distance information. The photoelectric conversion system 2100 is also connected to an alarm system 2140. The alarm system 2140 gives an alarm to the driver based on the determination by the collision determination portion 2118. For example, if the collision determination portion 2118 determines a high possibility of collision, the control ECU 2130 performs a vehicle control that avoids collision and reduces damage by braking, releasing the accelerator, limiting the engine output, or the like. The alarm system 2140 warns the user by sounding an alarm such as sound, displaying alarm information on a screen of a car navigation system or the like, giving vibration to a seatbelt and steering, or the like.

In this example, the surroundings of the vehicle such as front or rear are imaged by the photoelectric conversion system 2100. FIG. 18B shows the photoelectric conversion system 2100 when imaging the front of the vehicle (imaging range 2150). The vehicle information acquisition system 2120 directs the photoelectric conversion system 2100 to operate and perform imaging. Using the imaging devices according to the above examples 1 to 5 as the imaging device 2110, the photoelectric conversion system 2100 in this embodiment may provide more improved ranging accuracy.

Although the above description shows an example control that prevents collision with other vehicles, the present disclosure may also apply to a control of autonomous driving following other vehicles, a control of autonomous driving preventing running over a traffic lane, or the like. In addition to a vehicle such as a car, the photoelectric conversion system may also apply to, for example, a mobile object (transportation equipment) such as a vessel, an aircraft, or an industrial robot. The moving device in the mobile object (transportation equipment) is one of various types of drive sources, including an engine, a motor, a wheel, and a propeller. In addition to a mobile object, the imaging system may also apply to equipment, such as Intelligent Transport Systems (ITS), that commonly uses the object recognition.

Other Embodiments

The photoelectric conversion apparatus may have a structure in which a first semiconductor chip (first substrate) on which pixels are disposed, and a second semiconductor chip (second substrate) on which read circuits (amplifiers) or signal processing circuits are disposed, are stacked (chip-stacked structure). The read circuits (amplifiers) on the second semiconductor chip may be column circuits respectively, corresponding to the pixel columns on the first semiconductor chip. The read circuits (amplifiers) are an example of the signal processing circuits, and other circuits that perform signal processing may be disposed on the second semiconductor chip. The read circuits (amplifiers) on the second semiconductor chip may be matrix circuits respectively, corresponding to the pixels or pixel blocks on the first semiconductor chip. The first semiconductor chip and the second semiconductor chip may be connected by through-silicon via (TSV), inter-chip wiring by direct bonding of metal (e.g. copper (Cu)), inter-chip connection using micro bumps, or the like.

Miscellaneous

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-211290, filed on Dec. 24, 2021, which is hereby incorporated by reference herein in its entirety.

What is claimed is:

1. A photoelectric conversion apparatus comprising:
   pixels disposed two-dimensionally in a row direction and a column direction;
   an L number of (L is 3 or greater integer) vertical signal lines disposed on each pixel column;

an M number of (M is 2 or greater integer) selection circuits disposed in each pixel, each of the selection circuits respectively connecting one of the pixels to a different vertical signal line;

a vertical scanning circuit configured to scan the selection circuits; and a control unit, wherein the control unit is configured to set first operation mode in which the vertical scanning circuit performs a single read scanning operation at a time, and a second operation mode in which the vertical scanning circuit performs a plurality of read scanning operations at a time, wherein, in the first operation mode, the control unit is configured to perform the read scanning operation using a first selection circuit out of the M number of selection circuits, and wherein, in the second operation mode, the control unit is configured to perform the read scanning operation using a second selection circuit, which is different from the first selection circuit, out of the M number of selection circuits, wherein the plurality of read scanning operations in the second operation mode include a first read scanning operation and a second read scanning operation, and wherein a cycle of the first read scanning operation is longer than a cycle of the second read scanning operation.

2. The photoelectric conversion apparatus according to claim 1, wherein the plurality of read scanning operations in the second operation mode include a first read scanning operation and a second read scanning operation, and wherein a pixel row to be read in the first read scanning operation is different from that to be read in the second read scanning operation.

3. The photoelectric conversion apparatus according to claim 2, wherein a number of pixel rows to be read in the first read scanning operation is larger than a number of pixel rows to be read in the second read scanning operation.

4. The photoelectric conversion apparatus according to claim 1, wherein each of the pixels includes two photodiodes and a floating diffusion connected to the two photodiodes, and wherein the selection circuit is configured to connect the floating diffusion and the vertical signal line.

5. The photoelectric conversion apparatus according to claim 1, further comprising:

a first substrate on which the pixels are disposed, and a second substrate on which a signal processing unit that processes signals read from the pixels is disposed, wherein the first substrate and the second substrate are stacked.

6. A photoelectric conversion system comprising:

the photoelectric conversion apparatus according to claim 1; and a signal processing unit configured to process signals outputted from the photoelectric conversion apparatus.

7. A mobile body comprising:

the photoelectric conversion apparatus according to claim 1;

a moving device;

a processing device configured to acquire information from signals outputted from the photoelectric conversion apparatus; and a control device configured to control the moving device based on the information.

8. A photoelectric conversion apparatus comprising:

pixels disposed two-dimensionally in a row direction and a column direction;

an L number of (L is 3 or greater integer) vertical signal lines disposed on each pixel column;

an M number of (M is 2 or greater integer) selection circuits disposed in each pixel, each of the selection circuits respectively connecting one of the pixels to a different vertical signal line;

a vertical scanning circuit configured to scan the selection circuits; and a control unit, wherein the control unit is configured to set first operation mode in which the vertical scanning circuit performs a single read scanning operation at a time, and a second operation mode in which the vertical scanning circuit performs a plurality of read scanning operations at a time, wherein, in the first operation mode, the control unit is configured to perform the read scanning operation using a first selection circuit out of the M number of selection circuits, and wherein, in the second operation mode, the control unit is configured to perform the read scanning operation using a second selection circuit, which is different from the first selection circuit, out of the M number of selection circuits, wherein the plurality of read scanning operations in the second operation mode include a first read scanning operation and a second read scanning operation, and wherein the second read scanning operation is performed for a plurality of times while the first read scanning operation is performed once.

9. A photoelectric conversion system comprising:

the photoelectric conversion apparatus according to claim 8; and a signal processing unit configured to process signals outputted from the photoelectric conversion apparatus.

10. A mobile body comprising:

the photoelectric conversion apparatus according to claim 8;

a moving device;

a processing device configured to acquire information from signals outputted from the photoelectric conversion apparatus; and a control device configured to control the moving device based on the information.

11. A photoelectric conversion apparatus comprising:

pixels disposed two-dimensionally in a row direction and a column direction;

an L number of (L is 3 or greater integer) vertical signal lines disposed on each pixel column;

an M number of (M is 2 or greater integer) selection circuits disposed in each pixel, each of the selection circuits respectively connecting one of the pixels to a different vertical signal line;

a vertical scanning circuit configured to scan the selection circuits; and a control unit, wherein the control unit is configured to set first operation mode in which the vertical scanning circuit performs a single read scanning operation at a time, and a second operation mode in which the vertical scanning circuit performs a plurality of read scanning operations at a time, wherein, in the first operation mode, the control unit is configured to perform the read scanning operation using a first selection circuit out of the M number of selection circuits, and wherein, in the second operation mode, the control unit is configured to perform the read scanning operation using a second selection circuit, which is different from the first selection circuit, out of the M number of selection circuits, wherein the first operation mode includes a first sub-mode in which a plurality of pixel rows are read without performing analog addition on the vertical signal line, and a second sub-mode in which a plurality of pixel rows are read with performing analog addition on the vertical signal line, wherein a number of the selection circuits disposed in one pixel is at least 3, wherein, in the first sub-mode, the read scanning operation is performed for each vertical signal line using any one of the selection circuits, wherein, in the second sub-mode, the read scanning operation is performed for each vertical signal line using a plurality of selection circuits including the selection circuit used in the first sub-mode, and wherein, in the second operation mode, the read scanning operation is performed using a selection circuit other than the selection circuits used in the second sub-mode.

12. A photoelectric conversion system comprising:
the photoelectric conversion apparatus according to claim 11; and
a signal processing unit configured to process signals outputted from the photoelectric conversion apparatus.

13. A mobile body comprising:
the photoelectric conversion apparatus according to claim 11;
a moving device;
a processing device configured to acquire information from signals outputted from the photoelectric conversion apparatus; and
a control device configured to control the moving device based on the information.

14. A photoelectric conversion apparatus comprising:
pixels disposed two-dimensionally in a row direction and a column direction;
an L number of (L is 3 or greater integer) vertical signal lines disposed on each pixel column;
an M number of (M is 2 or greater integer) selection circuits disposed in each pixel; and
a vertical scanning circuit configured to scan the selection circuits, wherein each of the vertical signal lines is connected to at least one selection circuit in every L rows, wherein P number of (P is an integer that is at least 1 and less than L) vertical signal lines out of the L number of vertical signal lines are connected to at least one selection circuit in every S×P (S is 2 or greater integer) rows, and wherein L−P number of vertical signal lines, other than the P number of vertical signal lines out of the L number of vertical signal lines, are connected to at least one selection circuit in every S×(L−P) rows.

15. A photoelectric conversion system comprising:
the photoelectric conversion apparatus according to claim 14; and
a signal processing unit configured to process signals outputted from the photoelectric conversion apparatus.

16. A mobile body comprising:
the photoelectric conversion apparatus according to claim 14;
a moving device;
a processing device configured to acquire information from signals outputted from the photoelectric conversion apparatus; and
a control device configured to control the moving device based on the information.

* * * * *